US006897629B2

(12) United States Patent
Wilton et al.

(10) Patent No.: US 6,897,629 B2
(45) Date of Patent: May 24, 2005

(54) METHOD AND APPARATUS FOR ADAPTIVE CONTROL AND PROTECTION OF HYBRID ELECTRIC VEHICLE SYSTEMS

(75) Inventors: Thomas F. Wilton, Centennial, CO (US); Joshua J. Anderson, Edgewater, CO (US)

(73) Assignee: Transportation Techniques, LLC, Denver, CO (US)

( * ) Notice: Subject to any disclaimer, the term of this patent is extended or adjusted under 35 U.S.C. 154(b) by 189 days.

(21) Appl. No.: 10/413,559

(22) Filed: Apr. 15, 2003

(65) Prior Publication Data

US 2004/0245947 A1 Dec. 9, 2004

Related U.S. Application Data

(63) Continuation-in-part of application No. 09/748,182, filed on Dec. 27, 2000, now Pat. No. 6,573,675.

(51) Int. Cl.[7] ................................................ H02P 1/00
(52) U.S. Cl. ....................... 318/139; 318/434; 318/376
(58) Field of Search ................................. 318/139, 434, 318/376, 587, 700, 560, 491; 180/65.2

(56) References Cited

U.S. PATENT DOCUMENTS

| 4,187,436 A | 2/1980 | Etienne |
| 5,285,862 A | 2/1994 | Furutani et al. |
| 5,318,142 A | 6/1994 | Bates et al. |
| 5,345,155 A | 9/1994 | Masaki et al. |
| 5,481,460 A | 1/1996 | Masaki et al. |
| 5,512,022 A | 4/1996 | Suzuki |
| 5,589,743 A | 12/1996 | King |
| 5,629,586 A | 5/1997 | Yasuda et al. |
| 5,629,596 A | 5/1997 | Iijima et al. |
| 5,642,270 A | 6/1997 | Green et al. |
| 5,650,713 A | 7/1997 | Takeuchi et al. |
| 5,726,541 A | 3/1998 | Glenn et al. |
| 5,739,664 A | 4/1998 | Deng et al. |
| 5,785,138 A | 7/1998 | Yoshida |
| 5,786,640 A | 7/1998 | Sakai et al. |
| 5,804,935 A | 9/1998 | Radev |
| 5,878,830 A | 3/1999 | Ruppert et al. |
| 5,898,282 A | 4/1999 | Drozdz et al. |
| 5,905,349 A | 5/1999 | Farkas et al. |
| 5,915,488 A | 6/1999 | Fliege |
| 5,924,504 A | 7/1999 | Ruppert, Jr. et al. |
| 6,073,712 A | 6/2000 | Buglione |
| 6,242,873 B1 | 6/2001 | Drozdz et al. |
| 6,314,346 B1 | 11/2001 | Kitajima et al. |
| 6,333,620 B1 | 12/2001 | Schmitz et al. |
| 6,483,198 B2 | 11/2002 | Schmitz et al. |
| 6,573,675 B2 | 6/2003 | Schmitz et al. |
| 2003/0057004 A1 * | 3/2003 | Morishita et al. ........... 180/65.2 |
| 2003/0057908 A1 * | 3/2003 | Kusaka et al. .............. 318/442 |

FOREIGN PATENT DOCUMENTS

| DE | 197 22 175 A1 | 12/1997 |
| EP | 0 177 770 A1 | 4/1986 |
| EP | 0 496 059 A1 | 7/1992 |
| EP | 0 906 847 A2 | 4/1999 |
| EP | 0 925 988 A2 | 6/1999 |
| WO | WO 94/07301 | 3/1994 |
| WO | WO 98/01941 | 1/1998 |

* cited by examiner

*Primary Examiner*—Karen Masih
(74) *Attorney, Agent, or Firm*—Oliff & Berridge, PLC

(57) ABSTRACT

A hybrid electric vehicle having an energy generation system, an energy storage system and at least one electric motor includes a controller for controlling operation of vehicle systems. The controller monitors the status of vehicle systems and system parameters and determines if all systems are operating within predetermined safe operating ranges. The controller generates commands based upon these determinations to disconnect and isolate systems that exceed safe operating ranges, and to modify or change operating commands sent to other systems to compensate for the isolated system or systems. The controller also generates commands to place system components into a safe configuration or state in shutdown or failure events so as to protect the vehicle and maintenance personnel from potential damage or injury. A method of adaptively controlling a hybrid electric vehicle is also provided.

18 Claims, 16 Drawing Sheets

METHOD AND APPARATUS FOR ADAPTIVE CONTROL AND PROTECTION OF HYBRID ELECTRIC VEHICLE SYSTEMS

This is a Continuation-in-Part of application Ser. No. 09/748,182 filed Dec. 27, 2000 now U.S. Pat. No. 6,573,675. The entire disclosure of the prior application is hereby incorporated by reference herein in its entirety.

BACKGROUND OF THE INVENTION

1. Field of Invention

This invention relates to methods and apparatus for adaptively controlling the safety states of electric and hybrid electric vehicle systems.

2. Description of Related Art

The desire for cleaner air has caused various federal, state, and local governments to adopt or change regulations requiring lower vehicle emissions. Increasing urban traffic congestion has prompted a need for increases in public mass transit services. All mass transit systems utilizes buses, at least in part, to transport people into, out of, and within traffic congested urban areas. Conventional buses use diesel powered internal combustion engines. Diesel engines produce emissions, including carbon monoxide, that contribute to air pollution. It is possible to refine cleaner diesel fuel. However, cleaner diesel fuel is more costly to refine and causes a corresponding increase in the cost of bus service.

Alternative fuels have been used to reduce emissions and conserve oil resources. Compressed natural gas has been used as an alternative fuel. Compressed natural gas does not produce as much power in conventional internal combustion engines as gasoline and diesel and has not been widely developed or accepted as an alternative to gasoline and diesel.

Additives have also been developed for mixing with gasoline to reduce emissions. Ethanol and MTBE have been added to gasoline to oxygenate the combustion of gasoline and reduce emissions of carbon monoxide. These additives, however, are believed to cause decreased gas mileage and, in the case of MTBE, to be a potential public health threat.

Electric vehicles have been developed that produce zero emissions. Electric vehicles are propelled by an electric motor that is powered by a battery array on board the vehicle. The range of electric vehicles is limited as the size of the battery array which can be installed on the vehicle is limited. Recharging of the batteries can only be done by connecting the battery array to a power source. Electric vehicles are not truly zero emitters when the electricity to charge the battery array is produced by a power plant that burns, for example, coal.

Hybrid electric vehicles have also been developed to reduce emissions. Hybrid electric vehicles include an internal combustion engine and at least one electric motor powered by a battery array. In a parallel type hybrid electric vehicle, both the internal combustion engine and the electric motor are coupled to the drive train via mechanical means. The electric motor may be used to propel the vehicle at low speeds and to assist the internal combustion engine at higher speeds. The electric motor may also be driven, in part, by the internal combustion engine and be operated as a generator to recharge the battery array.

In a series type hybrid electric vehicle, the internal combustion engine is used only to run a generator that charges the battery array. There is no mechanical connection of the internal combustion engine to the vehicle drive train. The electric traction drive motor is powered by the battery array and is mechanically connected to the vehicle drive train.

Conventional internal combustion engine vehicles control propulsion by increasing and decreasing the flow of fuel to the cylinders of the engine in response to the position of an accelerator pedal. Electric and hybrid electric vehicles also control propulsion by increasing or decreasing the rotation of the electric motor or motors in response to the position of an accelerator pedal. Electric and series type hybrid electric vehicles may be unable to accelerate properly if the power available from the battery or batteries and/or genset is insufficient.

Conventional internal combustion engine vehicles may also include systems to monitor the slip of a wheel or wheels to thereby control the engine and/or the brakes of the vehicle to reduce the slip of the wheel or wheels. In hybrid electric vehicles, however, it is necessary to control the speed and torque of the electric motor or motors to control the slip of wheels.

Conventional internal combustion engine vehicles may also include systems to monitor the status of major drivetrain components, such as the engine or transmission, to determine if there is a component failure. In some failure cases, these systems may reduce functionality or disable some or all vehicle components. In electric and hybrid electric vehicles, a system may also be included that monitors the status of various components, including the electric motor or motors, the battery packs or the electric generator.

SUMMARY OF THE INVENTION

The invention provides methods and apparatus for adaptively controlling the safety states of components in electric and hybrid electric vehicles.

An exemplary embodiment of a hybrid electric vehicle according to the invention, including an energy generation system, an energy storage system receiving current at least from the energy generation system, and at least one electric drive motor receiving current from the energy storage system, is adaptively controlled so that a command signal to the at least one electric drive motor follows and is proportional to a signal having a value indicative of a user demand. The vehicle propulsion is also adaptively controlled based on a state of charge and temperature of the energy storage system of the vehicle, an emission mode of the vehicle, a regenerative braking mode of the vehicle, and a nominal operating state of the at least one electric drive motor.

According to an exemplary embodiment, a method according to the invention for adaptively controlling propulsion of a hybrid electric vehicle including an energy generation system, an energy storage system receiving electric current at least from the energy generation system, and at least one electric drive motor receiving current from the energy storage system, includes generating a first signal having a value indicative of a user demand, generating a second signal having a value proportional to the first signal and indicative of a demand of the at least one electric drive motor, determining if the value of the first signal is larger than the value of the second signal, increasing the value of a command signal to the at least one electric motor, if the value of the first signal is not larger than the value of the second signal and decreasing the value of the command signal, if the value of the first signal is larger than the value of the second signal.

According to another exemplary embodiment, a method according to the invention for adaptively controlling the safety status of a hybrid electric vehicle including an energy generation system, an energy storage system receiving electric current at least from the energy generating system, and at least one electric drive motor receiving current from the energy storage system, includes monitoring the status of at least the energy generation system, the energy storage system and the drive motor systems to determine if any components are operating incorrectly or are in a fault state or a failure state, attempting to reset or correct the fault cause, disabling or isolating the component if unable to reset or correct the cause, and altering the control of other components to compensate for the failed component.

According to a further exemplary embodiment, a hybrid electric vehicle according to the invention includes an energy generation system, an energy storage system receiving current at least from the energy generation system, at least one electric drive motor receiving current from the energy storage system, a component that indicates a signal in the event of a failure, a controller that monitors failure signals and determines the failure of the component based upon the signal, generates a corresponding signal to reset or correct the failure signal, determines if the failure was corrected, disables or isolates the failed component, and generates signals to alter the control of other components.

Other features of the invention will become apparent as the following description proceeds and upon reference to the drawings.

BRIEF DESCRIPTION OF THE DRAWINGS

Various exemplary embodiments of this invention will be described in detail with reference to the following figures, wherein like numerals reference like elements, and wherein.

DESCRIPTION OF EXEMPLARY EMBODIMENTS

Figure 1:
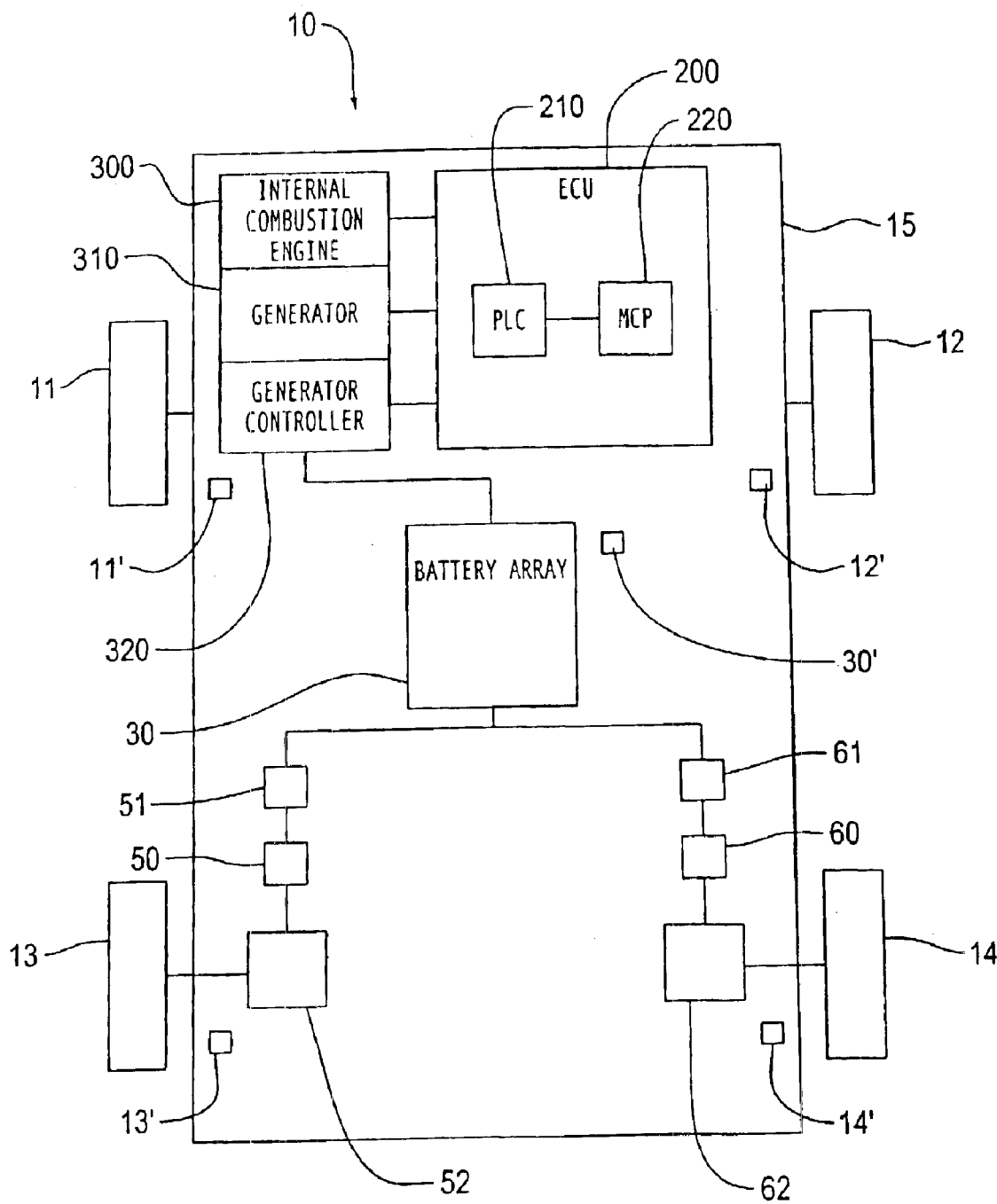
FIG. 1 is schematic view of an exemplary embodiment of a series hybrid electric vehicle according to the invention.

Referring to FIG. 1, an exemplary embodiment of a hybrid electric vehicle 10 which embodies the invention includes a plurality of wheels 11, 12, 13, and 14 and a vehicle chassis 15. The wheels 13 and 14 are coupled to electric motors 50 and 60, respectively, through gear boxes 52 and 62, respectively. The wheels 13 and 14 are independently mounted to respective suspension components, such as swing arms. In this embodiment, the wheels 13 and 14 are not coupled together by an axle. In other embodiments, the wheels 13 and 14 may be coupled together, for example, by an axle.

The wheels 13 and 14 may be either the front wheels or the rear wheels of the vehicle 10. In this embodiment, the wheels 11 and 12 are not driven and may be coupled together by an axle. In other embodiments, the wheels 11 and 12 may be driven.

Four wheel speed sensors 11'–14' are provided for sensing the rotational speed of each wheel 11–14, respectively.

In an exemplary embodiment of a vehicle which embodies this invention, the vehicle 10 is a bus having an occupancy capacity in excess of 100. However, it should be appreciated that the vehicle may be a bus of a smaller capacity or that the vehicle may be a smaller passenger vehicle, such as a sedan. Further, the invention is not limited to passenger vehicles, the invention can be used in any type of motor vehicle, including trucks, boats, etc. In various exemplary embodiments, the vehicle may be any size and form currently used or later developed.

The electric motors 50 and 60 are powered by an energy storage system, such as a battery array 30, and are controlled by motor controllers 51 and 61, respectively an energy storage system temperature sensor 30' detects the temperature of the battery array 30.

According to an exemplary embodiment of the vehicle 10, the electric motors 50 and 60 are synchronous, permanent magnet DC brushless motors. Each electric motor 50 and 60 is rated for 220 Hp and 0–11,000 rpm. The maximum combined power output of the electric motors 50 and 60 is thus 440 Hp. The permanent magnet DC brushless motors include permanent magnets, such as rare earth magnets, for providing a magnetic field as opposed to AC induction motors which create or induce a magnetic field on the rotating portion of the motor. The DC brushless motors are thus inherently more efficient than AC induction motors as no losses occur from inducing the magnetic field. The DC brushless motors also have a more useful torque profile, a smaller form factor, and lower weight than AC induction motors. The DC brushless motors also require less energy input for an equivalent power output than AC induction motors. However, this invention is not limited to permanent magnet DC brushless motors, and other types of electric motors, such as AC induction motors, can be used.

The hybrid electric vehicle 10 is preferably a series type hybrid electric vehicle that includes an energy generation system, such as a generator set (genset) 300, 310 including an internal combustion engine 300 and a generator 310 that is driven by the internal combustion engine 300. The internal combustion engine 300 may be powered by gasoline, diesel, or compressed natural gas. It should be appreciated, however, that the internal combustion engine 300 may be replaced by a fuel cell, turbine or any other number of alternatives for creating usable electric power.

According to an exemplary embodiment of the invention, the internal combustion engine 300 may be a 2.5 liter Ford LRG-425 engine powered by compressed natural gas. The 2.5 liter Ford LRG-425 engine produces 70 Hp. It should be appreciated that the power output of such an engine may be increased by increasing the RPM of the engine and decreased by decreasing the RPM of the engine. In this embodiment with two 220 Hp electric motors 50 and 60 and an internal combustion engine 300 operating at 70 Hp, the performance enhancement factor of the vehicle 10 is 440/70, or at least 6.2. Other internal combustion engines can of course be utilized.

In this embodiment, the generator 310 is a DC brushless generator that produces, for example, 240–400 $V_{AC}$. Other types of generators may be employed. In an exemplary embodiment of the vehicle 10, the generator is operated to produce 345 $V_{AC}$ during certain drive modes.

An output shaft of the internal combustion engine 300 is connected to the generator 310 to power the generator 310 and the AC voltage output by the generator 310 is converted to a DC voltage by a generator controller 320. The converted DC voltage charges the battery array 30. The battery array 30 may include, for example, 26 deep cycle, lead-acid batteries of 12 volts each connected in series. It should be appreciated, however, that other batteries, such as nickel cadmium, metal hydride or lithium ion, may be used and that any number of batteries can be employed, as space permits. In this embodiment, depending upon the load on the vehicle 10, the battery array voltage ranges between 240 and 400 $V_{DC}$.

An electronic control unit (ECU) 200 includes a programmable logic controller (PLC) 210 and a master control panel (MCP) 220. The MCP 220 receives information from various sensors, such as the wheel speed sensors 11'–14' and the battery array temperature sensor 30', and provides this information to gauges or other outputs in the vehicle 10, as desired. The PLC 210 executes various programs to control various components of the vehicle 10, for example, the internal combustion engine 300, the generator 310, the generator controller 320, the electric motors 50 and 60, and the motor controllers 51 and 61.

Although not shown in the drawings, the vehicle 10 may include a cooling system or cooling systems for the internal combustion engine 300, the generator controller 320, the battery array 30, the motor controllers 51 and 61, and the motors 50 and 60. The cooling system may be a single system which includes a coolant reservoir, a pump for pumping the coolant through a heat exchanger such as a radiator and a fan for moving air across the heat exchanger or a plurality of cooling systems similarly constructed. The ECU 200 controls the cooling systems, including the pumps and the fans, to perform a heat shedding operation in which the heat generated by the engine 300, the controllers 320, 51, and 61, the battery array 30, the motors 50 and 60, and various other systems is released to the atmosphere. Any acceptable means and methods for cooling the vehicle components may be utilized.

Figure 2:
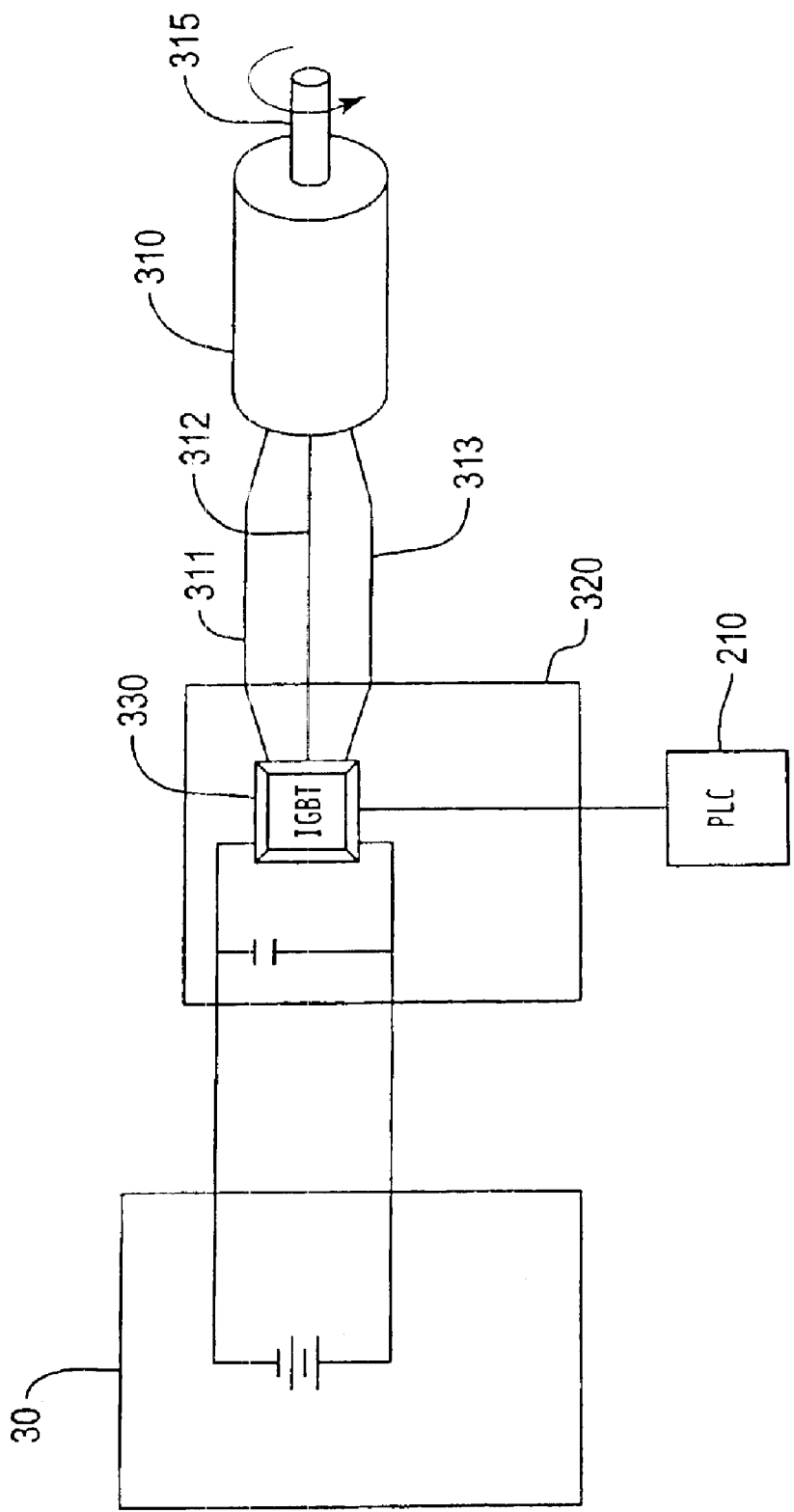
FIG. 2 is a schematic diagram illustrating an exemplary embodiment of a circuit for controlling charging of the battery array by the generator.

As shown in FIG. 2, the coils of the generator 310 are connected to the generator controller 320 by leads 311, 312, and 313. The generator controller 320 includes two switching insulated or isolated gate bipolar transistors (IGBT) 330 per phase of the generator 310 and their corresponding diodes. In an exemplary embodiment including a three phase generator 310, the generator controller 320 includes 6 IGBT 330 and six corresponding diodes.

The PLC 210 controls each IGBT 330 of the generator controller 320 to control the conversion of the AC voltage of the generator 310 to the DC voltage for charging the battery array 30. The PLC 210 may switch one or more of the IGBT 330's off when the SOC of the battery array 30 reaches an upper control limit, to stop the conversion of the AC voltage to DC voltage and prevent overcharging of the battery array 30.

According to an exemplary embodiment of the invention, the engine 300 runs continuously during operation of the vehicle 10 and continuously turns the shaft 315 of the generator 310. The PLC 210 switches each IGBT 330 on and off via high speed pulse width modulation (PWM) to control charging of the battery array 30. It should be appreciated however that the PLC 210 may control the charging of the battery array 30 by turning the engine 300 on and off, or in the alternative, by changing the RPM's of the engine 300.

Figure 3:
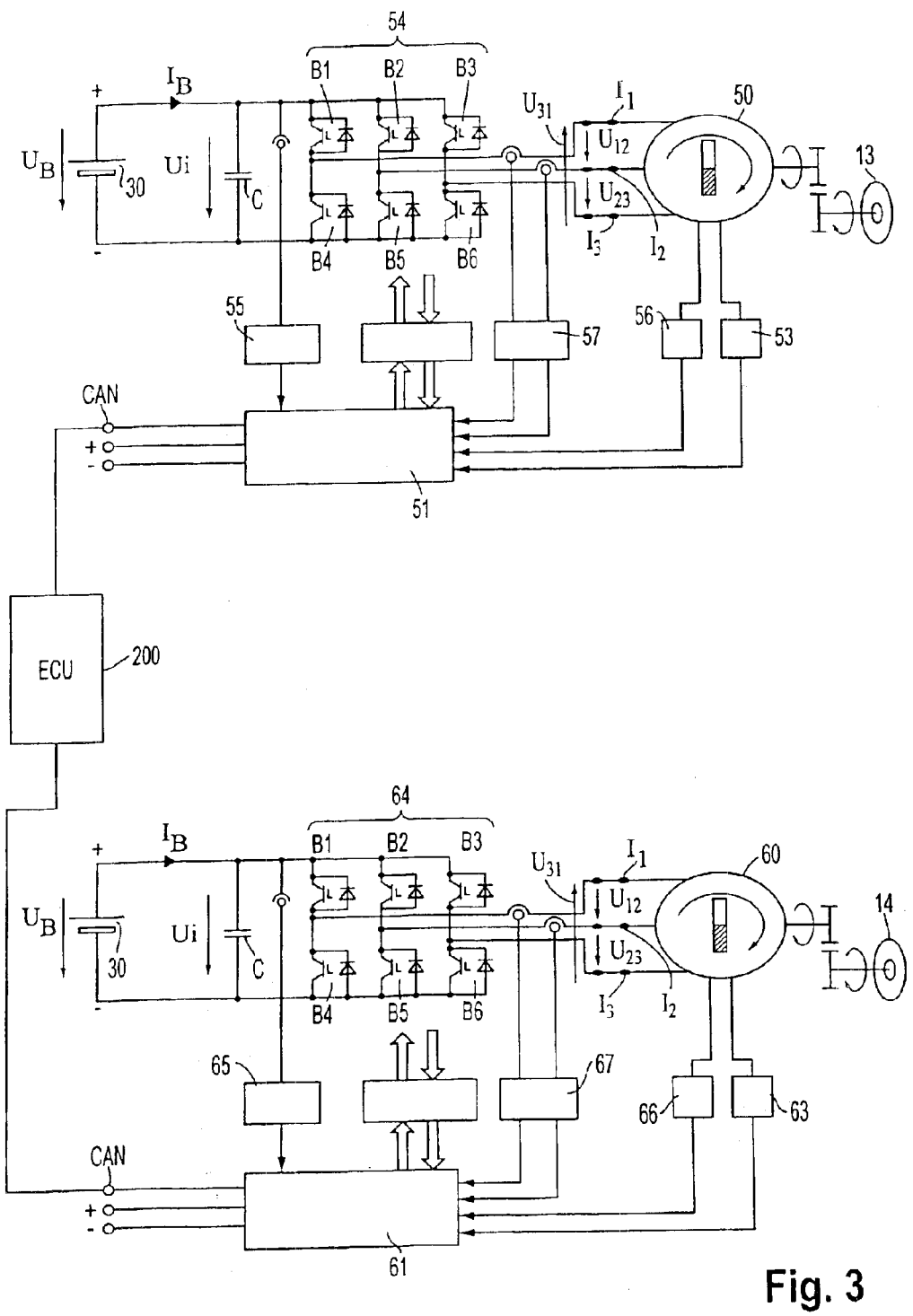
FIG. 3 is a diagram illustrating an exemplary embodiment of a circuit for controlling the electric motors.

A possible control circuit for the electric motors 50 and 60 is illustrated in FIG. 3, and includes the motor controllers 51 and 61. The motor controllers 51 and 61 receive power from the battery array 30 and distribute the power to the electric motors 50 and 60 by switches B1–B6 of pulse width modulation (PWM) inverters 54 and 64. The PWM inverters 54 and 64 generate AC current from the DC current received from the battery array 30. The battery current TB is distributed by the switches B1–B6, for example IGBT, of the PWM inverters 54 and 64 into motor currents $I_1$, $I_2$, and $I_3$ for driving the motors 50 and 60.

The motor controllers 51 and 61 distribute the battery current $I_B$ via the switches B1–B6 by factoring feedback from position sensors 53 and 63 and encoders 56 and 66 that determine the timing or pulsing of electromagnets of the motors 50 and 60. The pole position sensors 53 and 63 determine the pole positions of the permanent magnets of the motors 50 and 60 and the encoders 56 and 66 determine the phase angle. It should be appreciated that each pair of pole position sensors 53 and 63 and encoders 56 and 66, respectively, may be replaced by a phase position sensor and the phase change frequency may be read to determine the speed of rotation of the electric motors 50 and 60.

The motor controllers 51 and 61 calculate the motor connector voltages $U_{12}$, $U_{31}$, and $U_{23}$ based on the rotary velocity and the known flux value of the motors 50 and 60 between the motor connectors. The operating voltage of the inverters 54 and 64 is then determined by the rectified voltages of the diodes of the switches B1–B6 or by the voltage Ui, of an intermediate circuit including a capacitor C. If the voltage Ui becomes larger than the battery voltage $U_B$, uncontrolled current may flow to the battery array 30. Voltage sensors 55 and 65 determine the voltage Ui and the motor controllers 51 and 61 compare the voltage Ui to the battery voltage $U_B$. The motor controllers 51 and 61 activate the switches B1–B6 to cause magnetizing current to flow directly to the motors 50 and 60 to avoid unnecessary recharging of the battery array 30.

As shown in FIG. 3, each motor controller 51 and 61 receives control data from the ECU 200 through a controller area network (CAN). The ECU 200 can communicate with the various sensors and the motor controllers 51 and 61 by, for example, DeviceNet™, an open, global industry standard communication network.

Figure 4:
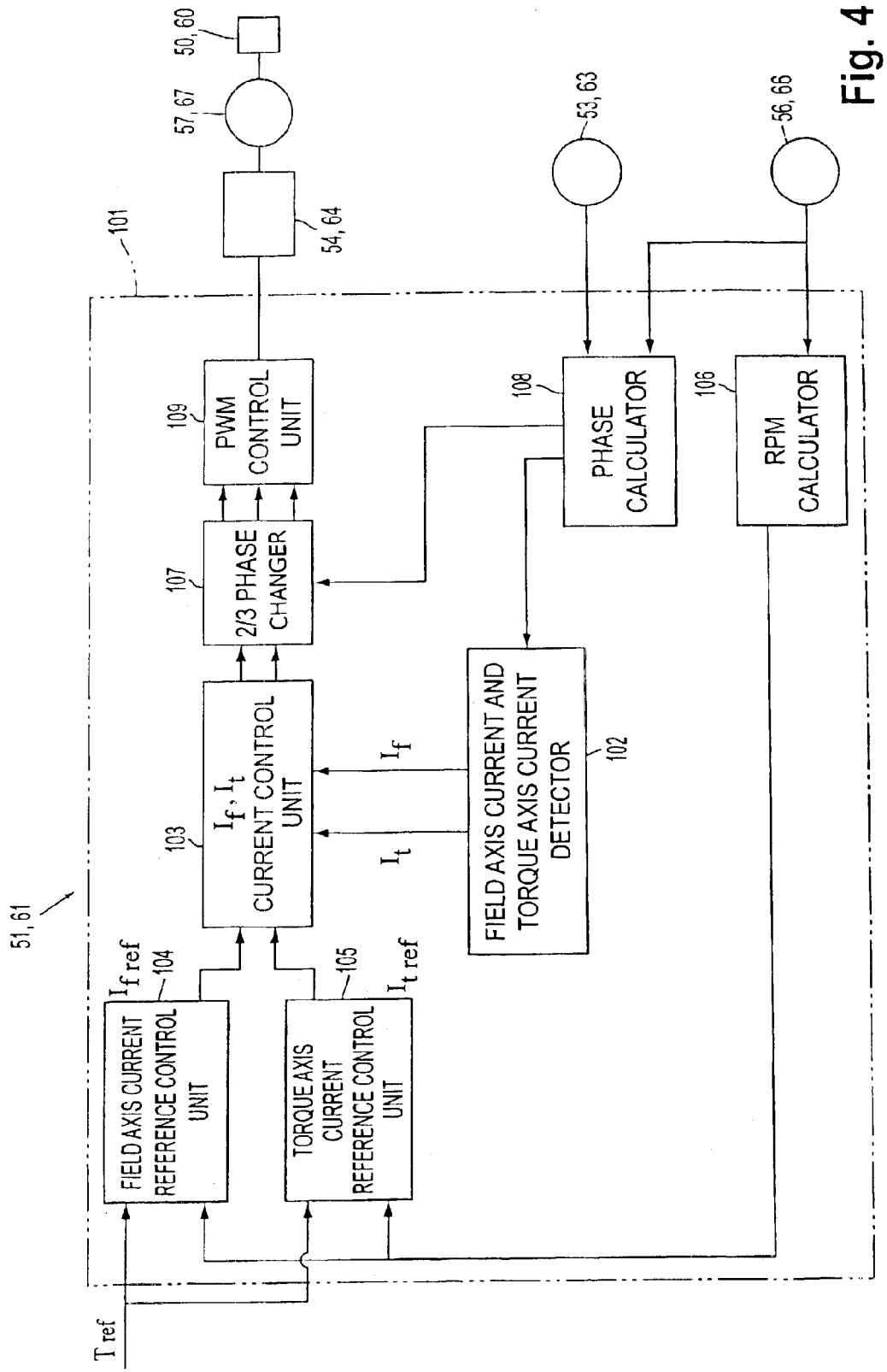
FIG. 4 is a diagram illustrating an exemplary embodiment of a circuit of the motor controllers.

Referring to FIG. 4, each motor controller 51 and 61 includes a control unit 101 including a field axis current and torque axis current detector 102. The detector 102 calculates the torque axis current $I_t$ and the field axis current $I_f$ of each motor 50 and 60 by executing a 3-phase, 2-phase coordinate transfer from the input of the current detectors 57 and 67 that measure the 3-phase AC current of the motors 50 and 60 and the phase calculator 108 that received input from the pole position sensors 53 and 64 and the encoders 56 and 66. The torque axis current $I_t$ and the field axis current $I_f$ calculated by the detector 102 are input to a field axis current and torque axis current control unit 103. The current control unit 103 receives a field axis current reference value $I_{fref}$ from a field axis current reference control unit 104 and receives a torque axis current reference value $I_{tref}$ from a torque axis current reference control unit 105.

The reference control units 104 and 105 determine the current reference values $I_{fref}$ and $I_{tref}$ by comparing a torque reference value $T_{ref}$ (which is determined by the position of an accelerator pedal of the vehicle) with the actual rotational velocity determined by an rpm calculator 106 that receives input from the encoders 56 and 66. A ⅔ phase changer 107 receives input from a phase calculator 108 and calculates the 3-phase AC reference values by performing a 2-phase/3-phase coordinate transformation. A PWM control unit 109 generates a PWM signal by comparing the 3-phase reference values with a triangular wave signal which is input to the PWM inverters 54 and 64.

Figure 5:
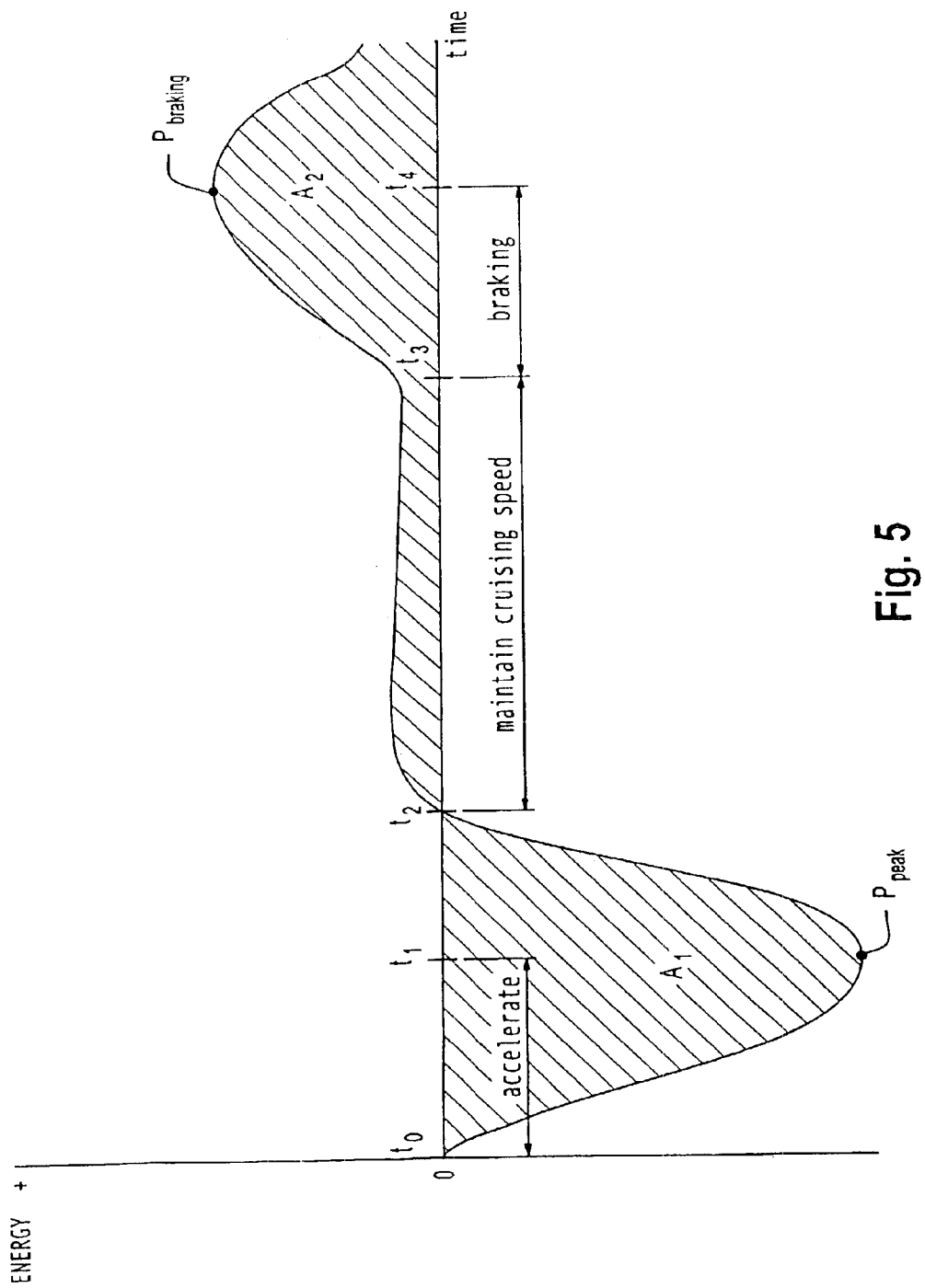
FIG. 5 is a diagram illustrating the relationship between the power created, the power stored, and the power consumed by the series hybrid electric vehicle according to the invention.

Referring to FIG. 5, the relationship between the power generated, the power stored, and the power consumed over time, by the series hybrid electric vehicle 10 according to the invention will be explained.

Power is consumed from the battery array 30 by the electric motors 50 and 60 during acceleration of the vehicle 10 to a cruising speed. As shown in FIG. 5, the vehicle 10 reaches cruising speed at time $t_1$ which corresponds to a peak power $P_{peak}$ of the electric motors 50 and 60. The peak power $P_{peak}$ the electric motors 50 and 60 is dependent on the driving mode (discussed below) of the vehicle 10 selected by the operator. In the exemplary embodiment of the invention in which the electric motors 50 and 60 are each 220 Hp, the peak power $P_{peak}$ consumed by the electric motors 50 and 60 is 440 Hp.

The power consumption (traction effort) of the electric motors 50 and 60 during acceleration is represented by the curve below the horizontal axis and the area defined by the curve below the horizontal axis between the times to and $t_2$ represents the total power consumption of the vehicle 10 during acceleration. In the event that the SOC of the battery array 30 is insufficient to achieve the cruising speed, the ECU 200 controls the motor controllers 51 and 61 to limit the peak power $P_{peak}$ the electric motors 50 and 60 may draw from the battery array 30. After the vehicle 10 has accelerated to cruising speed, the traction effort of the electric motors 50 and 60 may be reduced between the time $t_1$ and the time $t_2$, and the power consumption by the electric motors 50 and 60 may also be reduced.

The cruising speed of the vehicle 10 is maintained between the time $t_2$ and the time $t_3$. In this embodiment, during the time between $t_2$ and $t_3$, the genset 300, 310 is operated to produce power $P_{gen}$ higher than the power consumption (traction effort) of the electric motors 50 and 60 necessary to maintain the vehicle's cruising speed. The differential in power between the traction effort and the power generated $P_{gen}$ is stored in the battery array 30.

The power $P_{gen}$ generated by the genset 300, 310, in this embodiment, is dependent on the rpm of the engine 300 and a user demand signal sent to the genset 300, 310 that is controlled by the ECU 200. The ECU 200 controls the engine 300 to generally maintain the rpm of the engine 300, and the power generated $P_{gen}$, constant. However, it should be appreciated that the ECU 200 may control the engine 300 to reduce or increase the rpm of the engine 300, and thus the reduce or increase, respectively, the power generated $P_{gen}$ The power generated $P_{gen}$ by the genset 300, 310 may be reduced if the SOC of the battery array 30 approaches an upper control limit at which the battery array 30 may become overcharged. The power generated $P_{gen}$ by the genset 300, 310 may be increased if the SOC of the battery array 30 approaches a lower control limit at which the battery array 30 would be unable to drive the electric motors 50 and 60 with enough torque to propel the vehicle 10. In an exemplary embodiment of the vehicle 10 in which the engine 300 is a 2.5 liter Ford LRG-425 engine powered by compressed natural gas, the power generated $P_{gen}$ is 70Hp.

Regenerative braking occurs between the times $t_3$ and $t_4$ when the vehicle 10 decelerates after release of the accelerator pedal or when the vehicle 10 travels on a downhill slope at a constant speed. During regenerative braking, the electric motors 50 and 60 function as generators and current is supplied to the battery array 30 by the electric motors 50 and 60. The power generated $P_{braking}$ during regenerative braking is stored in the battery array 30.

The power generated by the genset 300, 310 during maintenance of the cruising speed and the power generated by regenerative braking $P_{braking}$ is represented by the curve above the horizontal axis and the area $A_2$ defined by the curve above the horizontal axis represents the total energy creation and storage of the vehicle 10 during maintenance of the cruising speed and regenerative braking.

The power $P_{gen}$ of the genset 300, 310 and the regenerative braking power $P_{braking}$ are controlled by the ECU 200 to substantially equal the energy consumption (traction effort) of the electric motors 50 and 60 during acceleration. In other words, the area $A_1$ defined by the curve below the horizontal axis is equal to the area $A_2$ defined by the curve above the horizontal axis. The ECU 200 controls the traction effort of the electric motors 50 and 60 (including the peak power $P_{peak}$) and the power generated $P_{gen}$ so that the power generated and the power stored do not exceed the power consumed, and vice versa, so as to maintain the SOC of the battery array 30 within a range of control limits. The ECU 200 controls the power generated $P_{gen}$ and the traction effort of the electric motors 50 and 60 so that the ampere hours during energy consumption do not exceed the thermal capacity of the battery array during power creation and storage.

An exemplary method for adaptively controlling the state of charge SOC of the battery array 30 is disclosed in U.S. patent application Ser. No. 09/663,118, filed Sep. 15, 2000, now U.S. Pat. No. 6,333,620, the entire contents of which are herein incorporated by reference.

Figure 6:
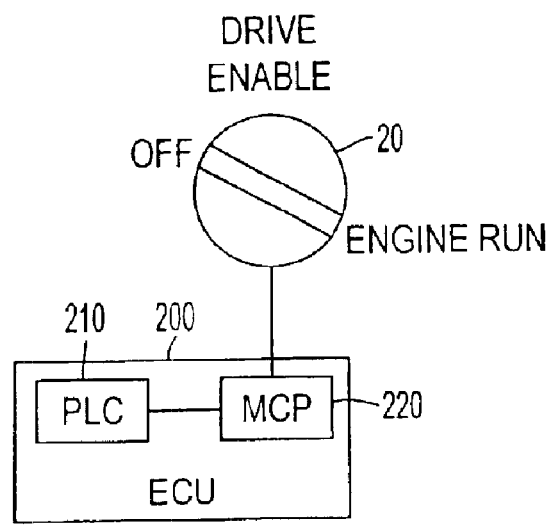
FIG. 6 is a diagram illustrating an exemplary embodiment of a master control switch.

This embodiment includes a master control switch. Referring to FIG. 6, a master control switch 20 positioned, for example, in an operator area of the vehicle 10, includes an OFF position, a DRIVE ENABLE position and an ENGINE RUN position. Any acceptable switch mechanism can be employed. The rotary switch 20 in FIG. 6 is merely an example of an acceptable switch. The position of the switch 20 is input to the MCP 220. When the switch 20 is moved to the DRIVE ENABLE position, the PLC 210 controls the electric motors 50 and 60 to run the vehicle in a driver selected zero emissions mode by drawing power from the battery array 30. The engine 300 is not operated during the zero emissions mode, i.e., when the switch 20 is in the DRIVE ENABLE position. The range of the vehicle 10 in zero emissions mode is limited as the SOC of the battery array 30 will eventually be lowered below a level sufficient to drive the electric motors 50 and 60 to propel the vehicle.

When the switch 20 is moved to the ENGINE RUN position, the ECU 200 instructs the generator 310 to operate as a motor for starting the engine 300. During the starting of the engine 300, the generator 310 receives current from the battery array 30. The current is supplied until the engine 300 reaches a predetermined idling speed and then the current supply is stopped. The engine 300 then drives the generator 310 to charge the battery array 30, as necessary.

The ECU 200 controls the engine 300 by monitoring the engine speed (rpm) as sensed by a tachometer (not shown) and the fuel mixture as sensed by an oxygen sensor (not shown). The ECU 200 may, for example, control the amount of fuel injected into the engine 300 and/or the position of a throttle valve of the engine 300. The ECU 200 may also monitor engine conditions such as the oil pressure and the coolant temperature as detected by sensors (not shown). An automatic zero emission mode is provided by the ECU 200 when the switch 20 is in the ENGINE RUN position when the SOC of the battery array 30 is sufficient or when the sensors of the vehicle 10 sense areas and routes where the zero emission mode is required. The ECU 200 will turn the engine 300 off, even though the switch 20 is in the ENGINE RUN position, when it determines that the zero emission mode is required. As discussed above, the zero emissions mode may be initiated when the SOC of the battery array 30 is sufficient or when designated areas or routes are entered. For example, the vehicle 10 may be equipped with sensors (not shown) responsive to signals from the global positioning system (GPS) or other signal emitting devices that indicate that the vehicle has entered an area or route where the zero emission mode is required.

Figure 7:
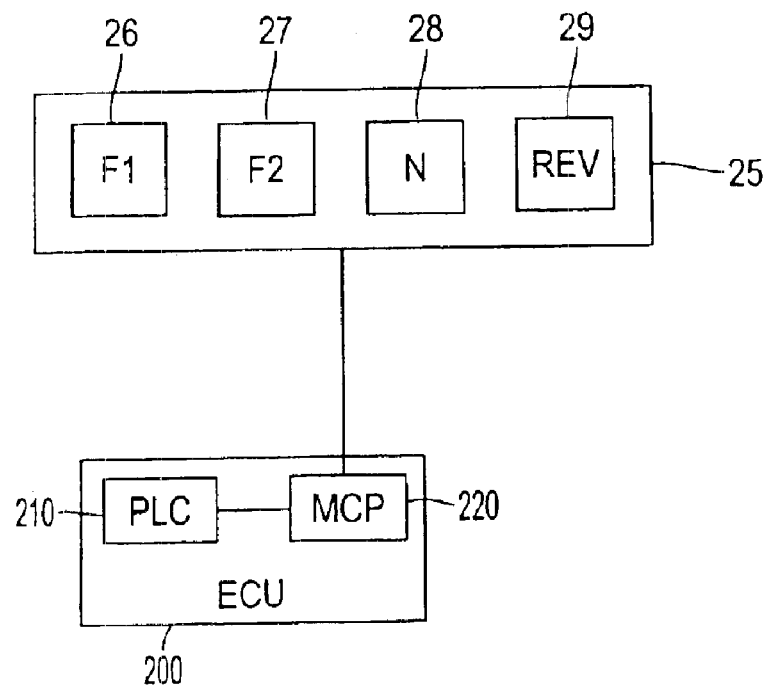
FIG. 7 is a diagram illustrating an exemplary embodiment of a driver's input control panel for determining a driving mode.

This embodiment also includes a control panel that controls the driving mode of the vehicle. Referring to FIG. 7, a control panel 25 positioned, for example, in the operator area of the vehicle 10, includes a plurality of switches 26–29. After starting the vehicle 10 by moving the master switch 20 to the engine run position, one of the switches 26–29 is selected to establish a driving mode of the vehicle 10. A first driving mode F1 is established by selecting switch 26. In this embodiment, the first driving mode F1 is established for driving the vehicle at lower speeds and under conditions in which the vehicle 10 will start and stop frequently. A second driving mode F2 is established by selecting switch 27. The second driving mode F2 is established for driving the vehicle at higher speeds and under conditions in which the vehicle is started and stopped less frequently. The ECU 200 controls the electric motors 50 and 60 depending on which driving mode is established. The maximum power output and rpm of the electric motors 50 and 60 in the second driving mode F2 are higher than the maximum power output and rpm of the motors 50 and 60 in the first driving mode F1.

While two driving modes are shown in FIG. 7 and discussed above, any number of modes can be provided. These modes can be directed to different driving conditions, road conditions, weather conditions, and the like.

The control panel 25 also includes a switch 28 to establish a neutral mode N. In the neutral mode N, the electric motors 50 and 60 are disengaged by the ECU 200 and the vehicle 10 is not propelled by the electric motors 50 and 60, even if an accelerator pedal (discussed below) is pressed by the operator.

A reverse mode R is established by selecting a switch 29. In the reverse mode R, the electric motors 50 and 60 are controlled to rotate in the opposite direction of the first and second driving modes F1 and F2 to propel the vehicle 10 in a reverse direction.

Figure 8:
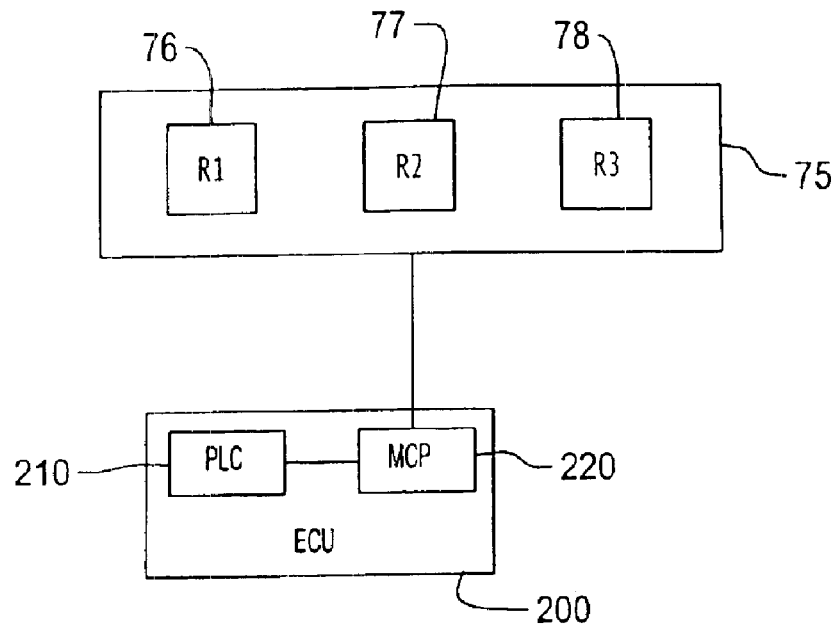
FIG. 8 is a diagram illustrating an exemplary embodiment of a driver's input control panel for determining a regenerative braking mode.

This embodiment may also include a second control panel for controlling the regenerative braking of the vehicle 10. Referring to FIG. 8, a second control panel 75 positioned, for example, in the operator area of the vehicle 10, includes a plurality of switches 76–78. After starting the vehicle 10 by moving the master switch 20 to the engine run position, one of the switches 76–78 is selected to establish a regenerative braking mode of the vehicle 10. A first regenerative braking mode R1 is established by selecting switch 76. In the first regenerative braking mode R1, the regenerative braking function is turned off. The first regenerative braking mode R1 may be selected during icy road conditions.

A second regenerative braking mode R2 may be selected by switch 77. The second braking mode R2 is selected when the regenerative braking effort should be minimal, such as wet road conditions or when the state of charge SOC of the battery array approaches an upper control limit UCL.

A third regenerative braking mode R3 may be selected by switch 78. The third braking mode R3 is selected when the regenerative braking efforts should be at a maximum, such as during dry road conditions or when the state of charge SOC of the battery array 30 approaches a lower control limit LCL.

Although the regenerative braking mode has been shown as selected by the operator, it should be appreciated that the ECU 200 may change the regenerative braking mode when certain conditions, such as slipping of any of the wheels 11–14, are detected. Moreover, while three modes are illustrated in this embodiment, any number of modes could be employed as desired, directed to any types of environmental conditions and/or operating parameters.

Figure 9:
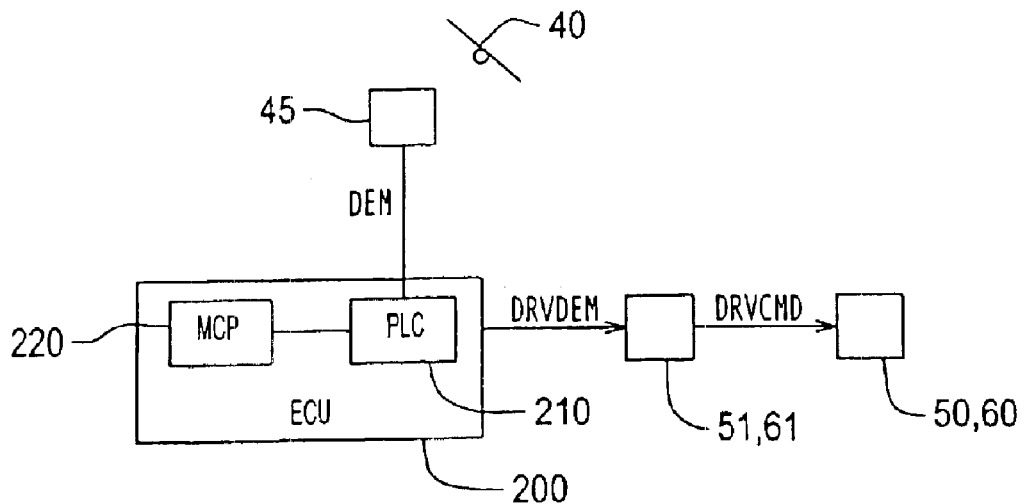
FIG. 9 is a diagram schematically illustrating an exemplary embodiment of the relationship between an accelerator pedal and the electric motors.

Referring to FIG. 9, the position of an accelerator pedal 40 is detected by a sensor 45. The sensor 45 sends a demand signal DEM indicative of the accelerator pedal 40 position, i.e., the user demand, to the MCP 220. The demand signal DEM has a value of zero when the accelerator pedal 40 is not depressed and a maximum value when the accelerator pedal 40 is fully depressed.

The ECU 200 sends a drive demand signal DRVDEM to the motor controllers 51 and 61. The drive demand signal DRVDEM follows and is proportional to the demand signal DEM of the sensor 45. However, due to a lag in the processing by the ECU 200, the instantaneous value of the demand signal DEM from the sensor 45 may be greater than or less than the drive demand signal DRVDEM produced by the ECU 200 and sent to the motor controllers 51 and 61. Accordingly, there is a difference in the signals equal to the difference between the instantaneous value of the demand signal DEM and the value of the drive demand signal DRVDEM. The motor controllers 51 and 61 send a drive command signal DRVDEM to the motors 50 and 60 to create torque and speed. The drive command signal DRVDEM follows and is proportional to the drive demand signal DRVDEM. The relationship between the value of the drive command signal DRVDEM and the instantaneous value of the drive demand signal DRVDEM is similar to the relationship between the drive demand signal DRVDEM and the instantaneous value of the demand signal DEM.

The ECU 200 uses a proportional-integral-derivative (PID) control mode to adaptively control the propulsion of the vehicle 10. The control mode may be stored as a program in a memory of the ECU 200 and executed by the PLC 210. The proportional mode produces an output proportional to the difference between the instantaneous value of the demand signal DEM and the drive demand signal DRVDEM. The integral mode produces an output proportional to the amount of the difference and the length of time the difference is present. The derivative mode produces an output proportional to the rate of change of the difference. The PID control mode may be applied to other systems of the vehicle 10 in addition to the control of the motors 50 and 60 for controlling the propulsion of the vehicle 10 and may be applied to systems that have transient differences and to systems that have steady-state differences. All three components, proportional, integral, and derivative, of the PID control mode are summed and can be adjusted in real time to create a controlled output, thus changing the system responsiveness.

The PID control mode is provided with parameters within which the signals necessary to control the electric motors 50 and 60, including the drive command signal DRVDEM, are adaptively adjusted and controlled. For example, the drive demand signal DRVDEM generated by the ECU 200 is proportional to the demand signal DEM sent by the accelerator pedal position sensor 45. Generally, the value of the drive demand signal DRVDEM is equal to 100% of the value of the demand signal DEM. However, within the PID control mode, the value of the drive demand signal DRVDEM may be set equal to 110% of the value of the demand signal DEM in order to increase the responsiveness of the vehicle 10. Conversely, the value of the drive demand signal DRVDEM may be set equal to 90% of the value of the demand signal DEM in order to decrease the responsiveness of the vehicle 10, for example when the state of charge SOC of the battery array 30 is insufficient to meet a sudden increase in user demand.

Additionally, a drive command upper control limit DRVCMDUCL and a drive command lower control limit DRVCMDLCL of the drive command signal DRVDEM are adaptively adjusted by the PID control mode in response to vehicle conditions, such as the driving mode and/or an emission mode of the vehicle 10. The drive command upper control limit DRVCMDUCL and drive command lower control limit DRVCMDLCL may be empirically determined and dependent on service conditions, such as terrain and weather conditions, that the vehicle 10 will likely be operated under. It should also be appreciated that the PID parameters are also empirically determined and may be any value. For example, the PID parameters may be determined so that the value of the drive demand signal DRVDEM may be as low as 80% of the value of the demand signal DEM and as high as 120% of the value of the signal DEM.

An exemplary embodiment of a method for adaptively controlling the propulsion of the series hybrid electric vehicle will be explained with reference to FIGS. 10–15. The control subroutines illustrated in FIGS. 10–15 are executed concurrently at predetermined time intervals during operation of the vehicle.

Figure 10:
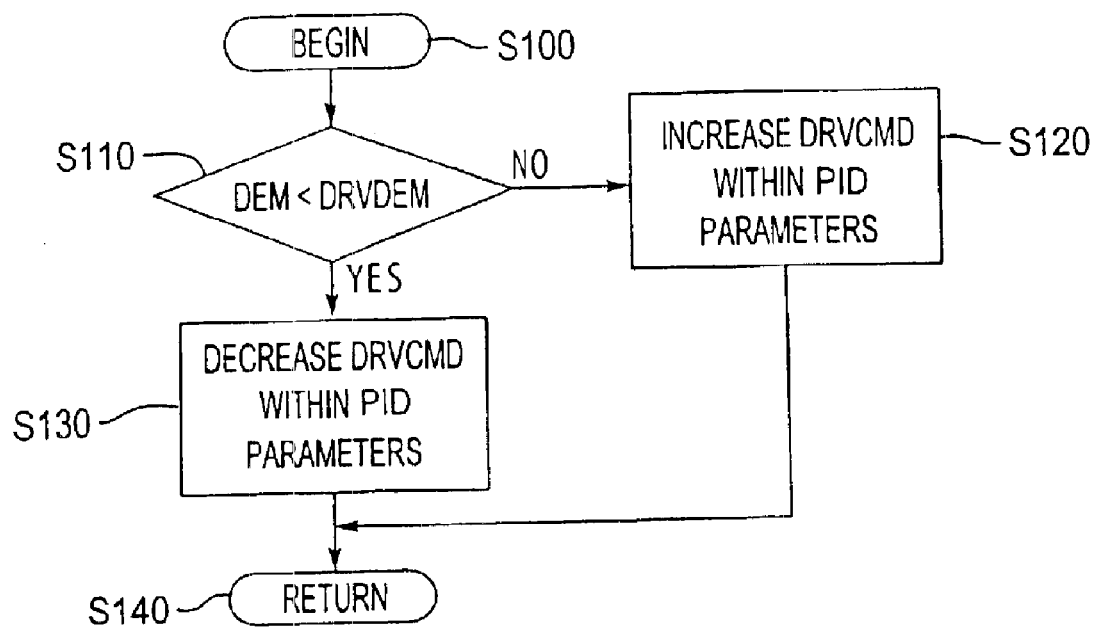
FIGS. 10–15 are flowcharts illustrating an exemplary adaptive control of the propulsion of the hybrid electric vehicle.

Referring to FIG. 10, a throttle control subroutine begins in step S100 and proceeds to step S110 where it is determined if the demand signal DEM is smaller than the drive demand signal DRVDEM. If the demand signal DEM is not smaller than the drive demand signal DRVDEM (S110: NO), the control proceeds to step S120 where the drive command signal DRVDEM to the motors 50 and 60 is increased within the PID parameters. The control then returns to the beginning in step S140. If the demand signal DEM is smaller than the drive demand signal DRVDEM (S110: Yes), the control proceeds to step S130 where the drive command signal DRVDEM to the motors 50 and 60 is decreased within the PID parameters. The control then returns to the beginning in step S140.

Figure 11:
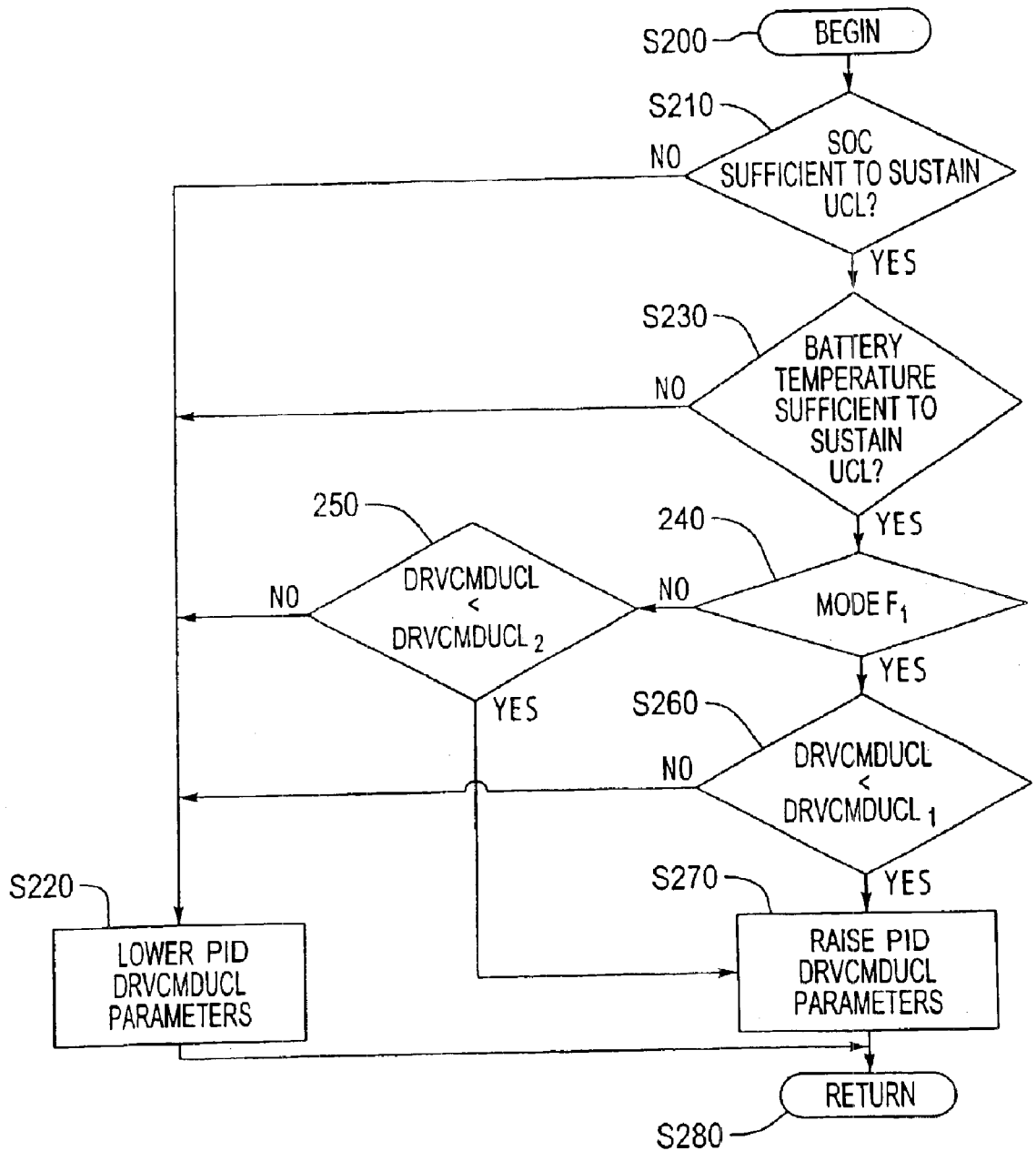

Referring to FIG. 11, a battery array state of charge subroutine begins in step S200 and proceeds to step S210 where it is determined if the battery array state of charge SOC is sufficient to sustain a state of charge upper control limit UCL. If the state of charge SOC is not sufficient (S210: No), the control proceeds to step S220 where the drive command upper control limit DRVCMDUCL parameters are lowered. The control then returns to the beginning in step S280. If the state of charge SOC is sufficient to sustain the state of charge upper control limit UCL (S210: Yes), the control proceeds to step S230 where it is determined if the battery array temperature is sufficient to sustain the state of charge upper control limit UCL.

If the battery array temperature is not sufficient to sustain the state of charge upper control limit UCL (S230: No), the control proceeds to step S220 where the drive command upper control limit DRVCMDUCL parameters are lowered. The control then returns to the beginning in step S280. If the battery array temperature is sufficient to sustain the state of charge upper control limit UCL (S230: Yes), the control proceeds to step S240 where it is determined if the vehicle 10 is in the first driving mode F1. If it is determined that the vehicle 10 is not in the first driving mode F1 (S240: No), the control proceeds to step S250 where it is determined if the drive command upper control limit DRVCMDUCL is less than a drive command upper control limit DRVCMDUCL2 associated with the second driving mode F2.

If it is determined that the drive command upper control limit DRVCMDUCL is not less than the drive command upper control limit DRVCMDUCL2 associated with the second driving mode F2 (S250: No), the control proceeds to step S220 where the drive command upper control limit DRVCMDUCL parameters are lowered. The control then returns to the beginning in step S280. If it is determined that the drive command upper control value DRVCMDUCL is less than the drive command upper control limit DRVCMDUCL2 associated with the second driving mode F2 (S250: Yes), the control proceeds to step S270 where the drive command upper control limit DRVCMDUCL parameters are raised. The control then returns to the beginning in step S280.

If it is determined that the vehicle 10 is in the first driving mode F1 (S240: Yes), the control proceeds to step S260 where it is determined whether the drive command upper control limit DRVCMDUCL is less than a drive command upper control limit DRVCMDUCL1 associated with the first driving mode F1. If the drive command upper control limit DRVCMDUCL is not less than the drive command upper control limit DRVCMDUCL1 associated with the first driving mode F1 (S260: No), the control proceeds to step S220 where the drive command upper control limit DRVCMDUCL parameters are lowered. The control then returns to the beginning in step S280.

If the drive command upper control limit DRVCMDUCL is less than the drive command upper control limit DRVCMDUCL1 associated with the first driving mode F1 (S260: Yes), the control proceeds to step S270 where the drive command upper control limit DRVCMDUCL parameters are raised. The control then returns to the beginning in step S280.

Figure 12:
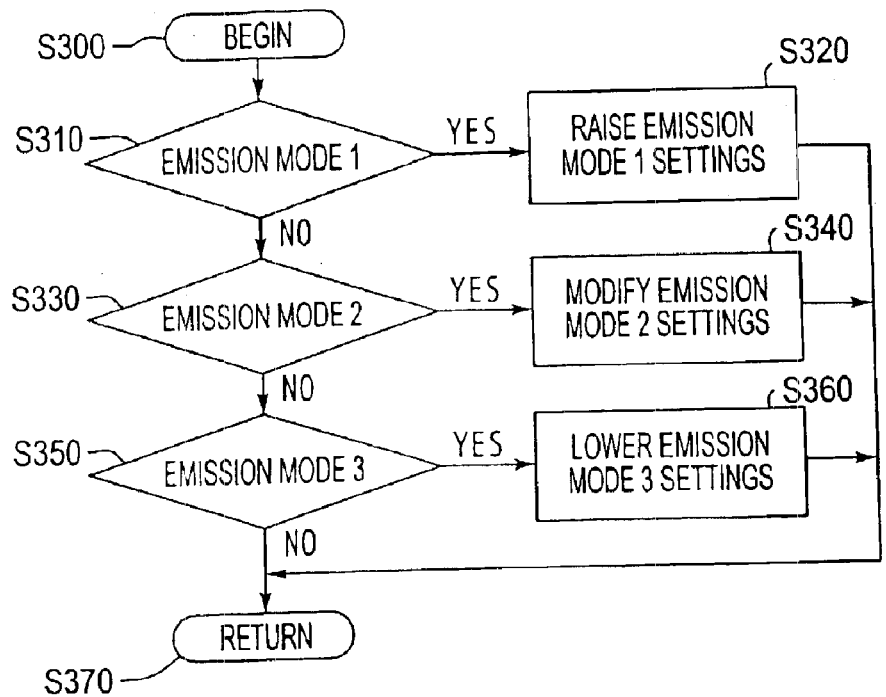

Referring to FIG. 12, an emission mode subroutine begins in step S300 and proceeds to step S310 where it is determined if the vehicle 10 is in a first emission mode. The first emission mode is a mode in which the engine 300 is at full output or where full output is allowed. If it is determined that the vehicle 10 is in the first emission mode (S310: Yes), the control proceeds to step S320 where the drive command upper control limit DRVCMDUCL and the drive command lower control limit DRVCMDLCL are raised. The control then returns to the beginning in step S370.

If it determined that the vehicle 10 is not in the first emission mode (S310: No), the control proceeds to step S330 where it is determined if the vehicle 10 is in a second emission mode. The second emission mode is a mode in which the engine 300 is at a minimum output. If it is determined that the vehicle 10 is in the second emission mode (S330: Yes), the control proceeds to step S340 where the drive command upper control limit DRVCMDUCL and the drive command lower control limit DRVCMDLCL are modified. If the vehicle 10 was previously in the first emission mode, the drive command upper control limit DRVCMDUCL and the drive command lower control limit DRVCMDLCL are lowered. If the vehicle 10 was previously in a third emission mode, the drive command upper control limit DRVCMDUCL and the drive command lower control limit DRVCMDLCL are raised. The control then returns to the beginning in step S370.

If it is determined that the vehicle 10 is not in the second emission mode (S330: No), the control proceeds to step S350 where it is determined if the vehicle 10 is in the third emission mode. The third emission mode is a mode in which the engine 300 is turned off. In other words, the third emission mode is a zero emission mode.

If it is determined that the vehicle 10 is in the third emission mode (S350: Yes), the control proceeds to step S360 where the drive command upper control limit DRVCMDUCL and the drive command lower control limit DRVCMDLCL are lowered. The control then returns to the beginning in step S370. If it is determined that the vehicle 10 is not in the third emission mode (S350: No), the control returns to the beginning in step S370.

Figure 13:
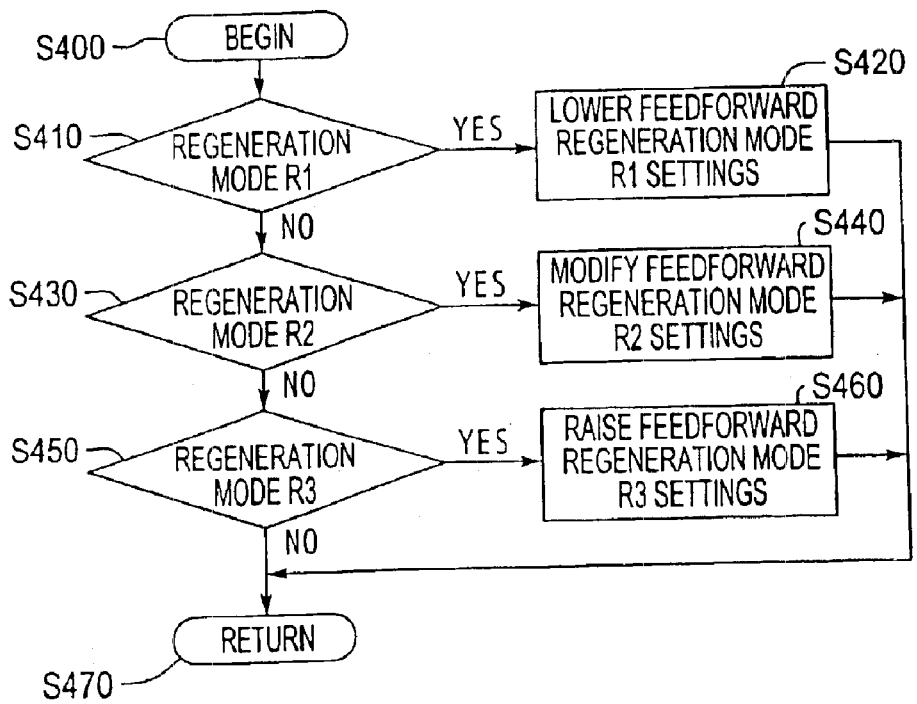

Referring to FIG. 13, a regenerative braking mode subroutine begins in step S400 and proceeds to step S410 where it is determined if the vehicle is in the first regenerative braking mode R1. If it is determined that the vehicle 10 is in the first regenerative braking mode R1 (S410: Yes), the control proceeds to step S420 where feedforward regeneration mode settings associated with the first regeneration mode R1 are lowered. The feedforward regeneration mode settings are used to raise the PID parameters to quicken the response of the system. The control then returns to the beginning in step S470.

If it is determined that the vehicle 10 is not in the first regenerative braking mode R1 (S410: No), the control proceeds to step S430 where it is determined if the vehicle is in the second regenerative braking mode R2. If the vehicle is in the second regenerative braking mode R2 (S430: Yes), the control proceeds to step S440 where the feedforward regeneration mode settings associated with the second regenerative braking mode R2 are modified. If the state of charge SOC is approaching the upper control limit UCL, the feedforward regeneration mode settings associated with the second regenerative braking mode R2 are lowered. Conversely, if the state of charge SOC is approaching the lower control limit LCL, the feedforward regeneration mode settings associated with the second regenerative braking mode R2 are raised. The control then returns to the beginning in step S470.

If is determined that the vehicle 10 is not in the second regenerative braking mode R2 (S430: No), the control proceeds to step S450 where it is determined if the vehicle 10 is in the third regenerative braking mode R3. If the vehicle 10 is in the third regenerative braking mode R3 (S450: Yes), the control proceeds to step S460 where the feedforward regeneration mode settings associated with the third regenerative braking mode R3 are raised. The control then returns to the beginning in step S470. If it is determined that the vehicle 10 is not in the third regenerative braking mode R3 (S450: No), the control returns to the beginning in step S470.

Figure 14:
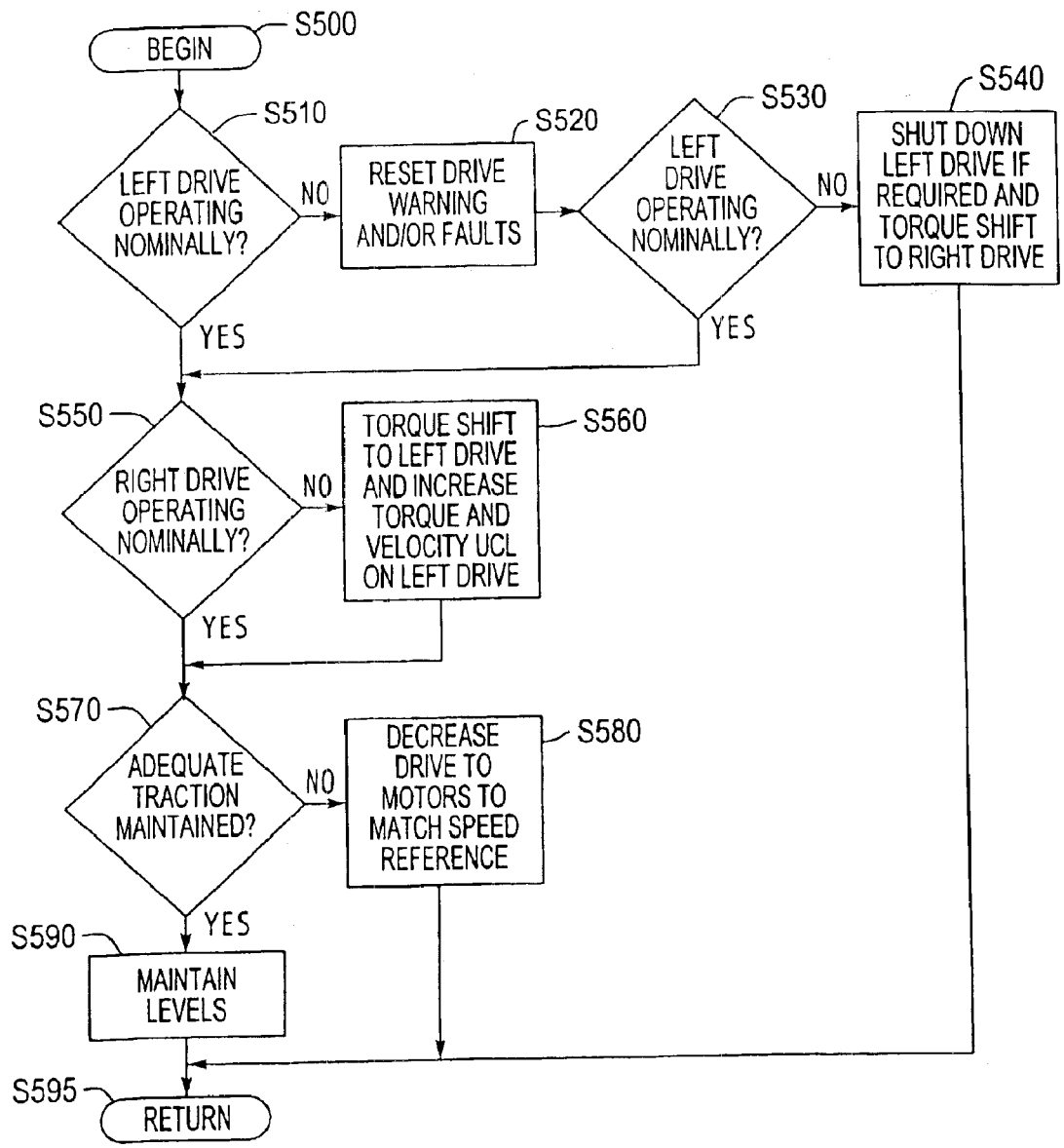

Referring to FIG. 14, a left traction control subroutine for the electric motor 50 (left drive), in an exemplary embodiment in which the vehicle 10 is rear wheel drive, begins in step S500 and proceeds to step S510 where it is determined if the electric motor 50 is operating nominally. According to an exemplary embodiment of the invention, the electric motor 50 is determined to be operating nominally if the voltage and temperature of the electric motor 50 are within predetermined parameters. If the electric motor 50 is not operating nominally (S510: No), the control proceeds to step S520 where a drive warning and/or faults are reset. The faults are error codes generated by the ECU 200 upon detection of abnormalities, such as a short circuit in an IGBT 330 or failure of an encoder 56 or 66. The control then proceeds to step S530 where it is determined if the electric motor 50 is operating nominally. If the electric motor is still not operating nominally (S530: No), the control proceeds to step S540 where the electric motor 50 is shut down if required and torque is shifted to the right side by increasing the torque drive command to the electric motor 60. The control then returns to the beginning in step S595.

If after resetting the drive warning and/or faults, it is determined that the electric motor 50 is operating nominally (S530: Yes), the control proceeds to step S550 where it is determined if the electric motor 60 (right drive in the exemplary rear wheel drive vehicle 10) is operating nominally. The electric motor 60 is determined to be operating nominally if the voltage and temperature of the electric motor 60 are within predetermined parameters. If the electric motor 60 is not operating nominally (S550: No), the control proceeds to step S560 where torque is shifted to the left drive by increasing the drive to the electric motor 50 and increasing upper control limits of the torque and velocity of the electric motor 50. The control then proceeds to step S570. If it is determined that the electric motor 60 is operating nominally (S550: Yes), the control proceeds directly to step S570.

In step S570, it is determined if adequate traction is maintained. Adequate traction is not maintained if excessive slippage is detected between a rear wheel 13 or 14 and a speed reference which is a value slightly higher than the speed of the front wheels 11 and 12. If adequate traction is not maintained (S570: No), the control proceeds to step S580 where the drive to motors 50 and 60 is decreased until the speed of the wheels 13 and 14 matches the speed reference. The control then returns to the beginning in step S595. If adequate traction is maintained (S570: Yes), the drives to the motors 50 and 60 are maintained in step S590. The control then returns to the beginning in step S595.

Figure 15:
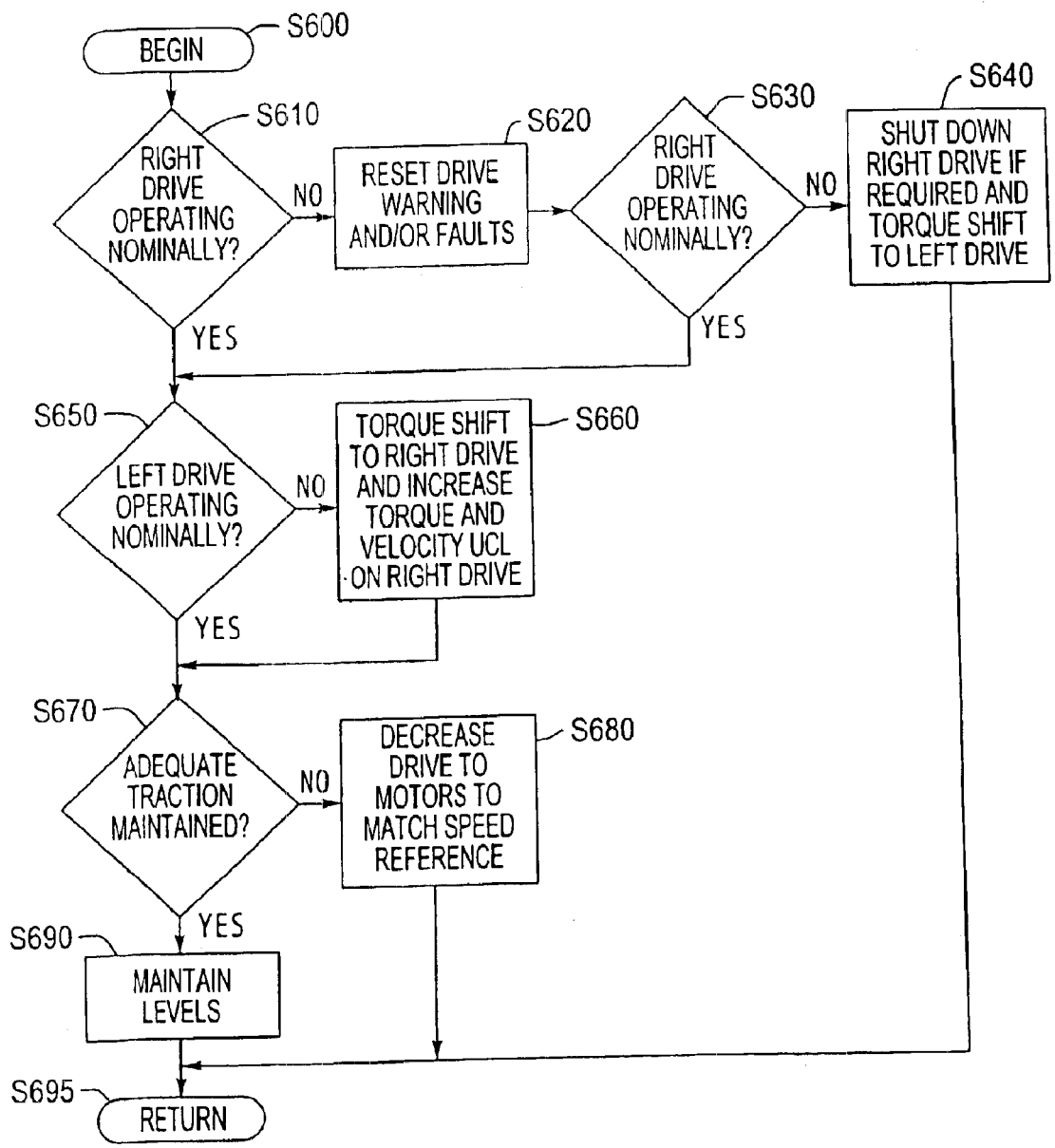

Referring to FIG. 15, a right traction control subroutine including steps S600–S695 for the electric motor 60 (right drive) corresponds to the steps S500–S595 of the left traction control subroutine shown in FIG. 14. The right drive is checked in steps S610 and S630 to determine if the electric motor 60 is operating nominally and the left drive is checked in step S650 to determine if the electric motor 50 is operating nominally.

Figure 16:
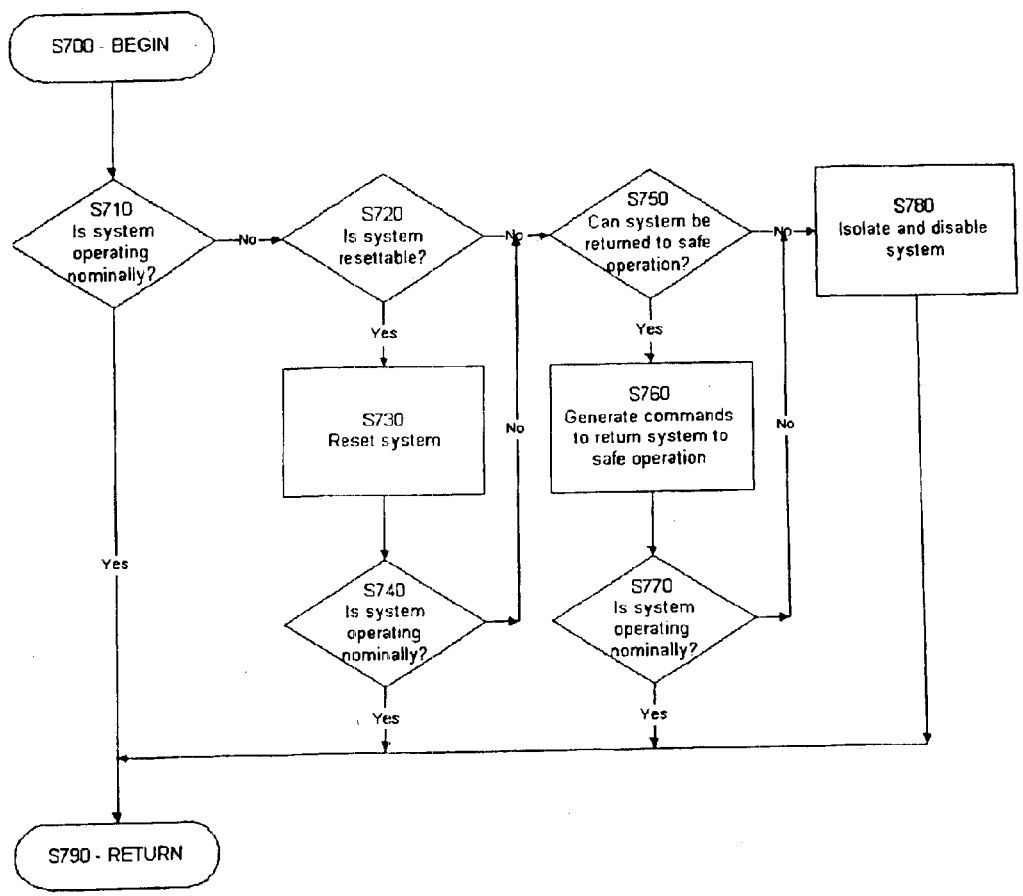
FIGS. 16–19 are flowcharts illustrating an exemplary adaptive control of the safety controls of the hybrid electric vehicle.

Referring to FIG. 16, a safety checking subroutine includes steps S700–S790 for use in troubleshooting critical vehicle systems. Critical systems preferably include any system where a failure or fault could result in serious potential injury to a vehicle operator or service personnel. In an exemplary embodiment, these systems may include electric traction motors 50 and 60, drive motor controllers 51 and 61, internal combustion engine 300, generator 310, generator controller 320 or battery array 30. It will be appreciated that the safety routine is not limited to this particular implementation but may be extended to other devices or systems installed in a vehicle.

According to an exemplary embodiment of the invention, the system is determined to be operating nominally if the voltage, temperature, or other critical aspects of the system are within predetermined parameters. If the system is not operating nominally (S710: No), the control proceeds to step S720, where it is determined if the system may be reset. In an exemplary embodiment, the system is an electric motor 50, and may be reset if in a warning or fault state. It will be appreciated that other systems may be employed and may or may not have the capability to be reset. If the system may be reset (S720: Yes), the control proceeds to step S730 where the system is reset. The control then proceeds to step S740 where it is determined if the system is operating nominally. If the system is operating nominally (S740: Yes), the system returns to the beginning in step S790. If the system is still not operating nominally (S740: No), the control proceeds to step S750 where it is determined if there are additional methods that may be employed to return the systems to nominal operation. In an exemplary embodiment where the system is an electric motor 50, an additional method may include reducing the generated torque command from the ECU 200 to the drive motor to reduce the internal operating temperature of the drive motor and allow the cooling system to bring the drive motor back to a nominal state. It will be appreciated that other or multiple methods may be used to return the motor to a nominal state, and that other systems may also be returned to a nominal state by this or other methods.

If it is determined that there is at least one additional method that may be employed to return the system to a nominal state (S750: Yes), the control proceeds to step S760, where commands are generated to use at least this method to return the system to a nominal state. The control then proceeds to step S770, in which it is determined if the system is operating nominally. If the system is still not operating nominally (S770: No), or if no methods were employed to return the system to a nominal state (S750: No), the control proceeds to step S780, where the system is isolated and disabled to prevent damage to the vehicle or component, and prevent the system from presenting an injury hazard to the operator or service personnel. In an exemplary embodiment where the system is a drive motor 50, the IGBT 330 may be switched off, or a relay or contactor between the battery array 30 and the drive controller 51 may be opened to prevent transmission of electric current to or from the drive motor. It will be appreciated that there are other methods that may be employed, and that alternate systems may require other or different methods to become isolated or disabled. The control then returns to the beginning in step S790.

Figure 17:
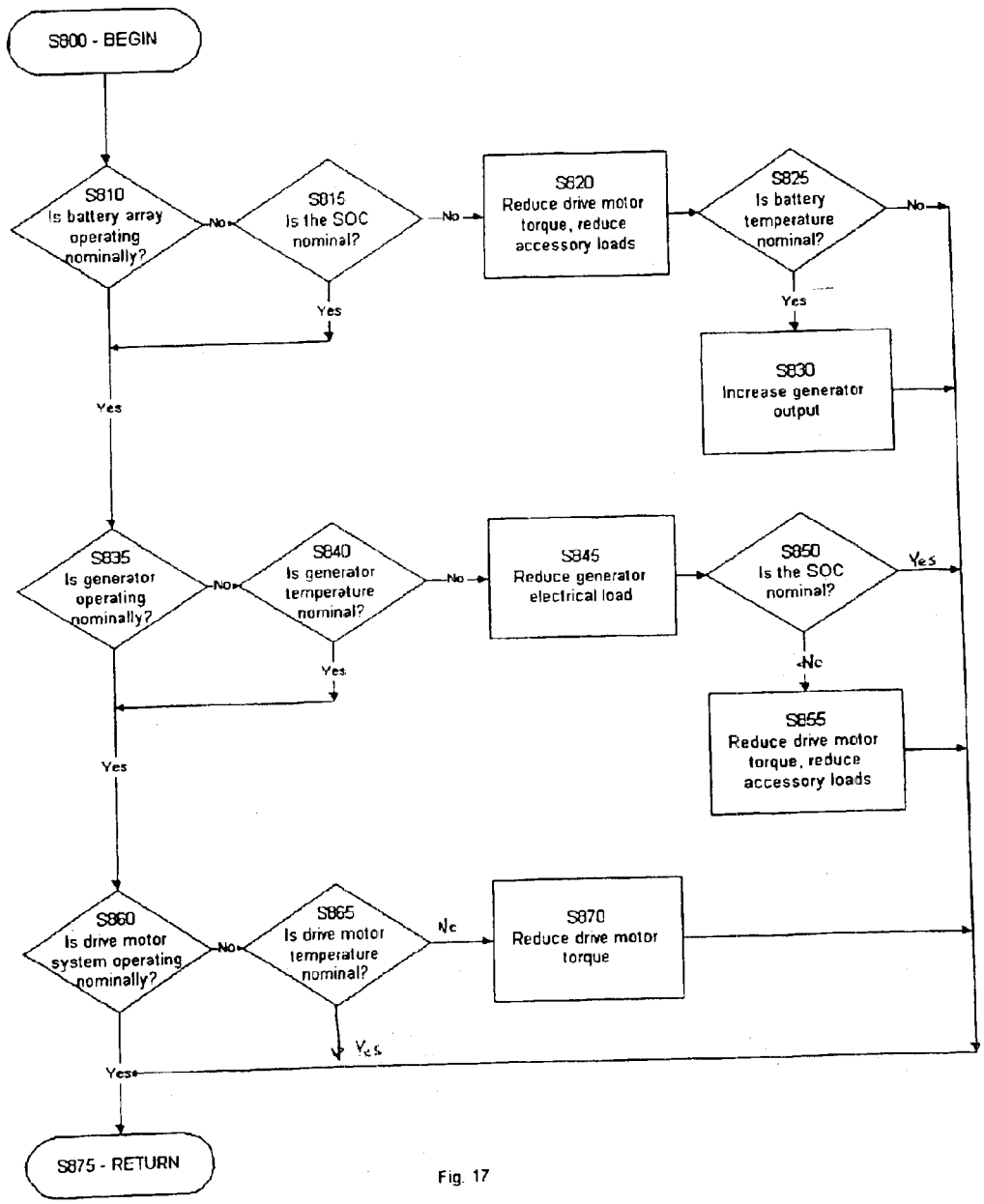

Referring to FIG. 17, a method to return a non-safe system to a nominal state includes steps S800–S875. The method may include reducing loads placed on the non-safe system by other systems. It may also include operating the non-safe system with decreased parameters or performance, and/or may include increasing parameters or performance of other vehicle systems to compensate for the non-safe system that is not operating nominally. In an exemplary embodiment, these systems may include electric traction motors 50 and 60, drive motor controllers 51 and 61, internal combustion engine 300, generator 310, generator controller 320 or battery array 30. It will be appreciated that the control routine is not limited to this particular implementation but may be extended to other devices or systems installed in a vehicle.

According to an exemplary embodiment of the invention, the system is determined to be operating nominally if the voltage, temperature, or other critical aspects of the system are within predetermined parameters. The control includes divisional examination of each system in turn. In an exemplary embodiment, if the battery system 30 is not operating nominally (S810: No), the control proceeds to step S815, where it is determined if the battery state of charge is in a nominal range. If it is not, (S815: No) the control proceeds to step S820, where the drive torque is reduced to limit power removed from the battery pack, and electrical accessory loads are reduced to limit power removed from the battery pack. The control then proceeds to step S825, where it is determined if the battery pack temperature is nominal. If it is not, (S825: No), the control proceeds to S875, where it returns to the beginning. If the temperature in step S825 is determined to be nominal (S825: Yes), the generator 310 output may be increased to add additional power to the battery pack 30.

If the battery pack was determined to be operating nominally, (S815: Yes), the control proceeds to S835, where it is determined if the generator set is operating nominally. If it is not (S835: No), the control proceeds to step S840 where it is determined if the generator temperature is nominal. If it is (S840: Yes), the control proceeds to step S860. If it is not, the control proceeds to step S845, where the generator electrical load is reduced. The control then proceeds to step S850, where it is determined if the battery state of charge is in a nominal range. If it is (8850: Yes), the control proceeds to S875, where it returns to the beginning. If it is not (S850: No) the control proceeds to step S855, where the drive torque is reduced to limit power removed from the battery pack, and electrical accessory loads are reduced to limit power removed from the battery pack. The control then proceeds to S875, where it returns to the beginning.

If the generator was determined to be operating nominally (S835: Yes), the control proceeds to step S860, where it is determined if the drive motor is operating nominally. If it is (S860: Yes) then the control proceeds to step S875 and returns to the beginning. If it is not (S860: No), the control proceeds to step S865, where it is determined if the drive motor temperature is nominal. If it is (S865: Yes), the control proceeds to S875, where it returns to the beginning. If it is not, the control proceeds to S870, where the drive motor torque is reduced to reduce the heat produced in the drive motor. The control proceeds to S875, where it returns to the beginning.

Figure 18:
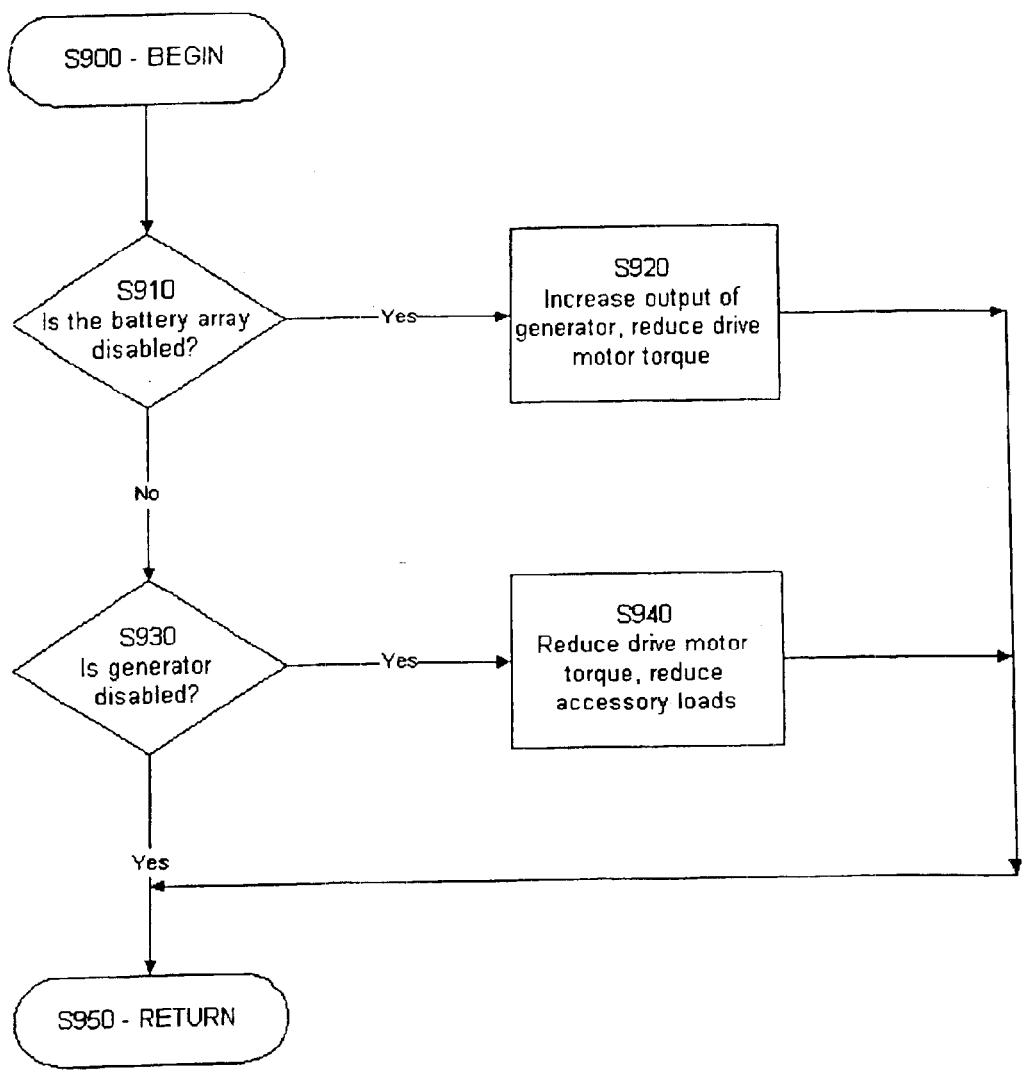

Referring to FIG. 18, a reduced vehicle capability subroutine includes steps S900–S950 for use allowing limited mobility for vehicles where some systems have been disabled, by a method such as that outlined in FIG. 16. In an exemplary embodiment, these systems may include electric traction motors 50 and 60, drive motor controllers 51 and 61, internal combustion engine 300, generator 310, generator controller 320 or battery array 30. It will be appreciated that the safety routine is not limited to this particular implementation, but may be extended to other devices or systems installed in a vehicle.

According to an exemplary embodiment of the invention, the control begins at step S900, and proceeds to step S910, where it is determined if the battery array 30 is disabled. If it is disabled (S910: Yes), the control proceeds to step S920 where the generator 310 output is increased to compensate for electrical power not supplied by the battery array, and the maximum drive motor torque is reduced to limit the amount of power required. The control then proceeds to step S950, where it returns to the beginning. If the battery array is not disabled (S910: No), the control proceeds to step S930, where it is determined if the generator 310 has been disabled. If it has been disabled (S930: Yes) then the control proceeds to step S940, where the drive motor torque is reduced to limit the amount of power removed from the battery array. Other non-critical components may also be disabled in step S940 to limit the amount of power required from the battery array. The control then proceeds to step S950, where it returns to the beginning. If the generator has not been disabled (S930: No), the control then proceeds to step S950, where it returns to the beginning.

Figure 19:
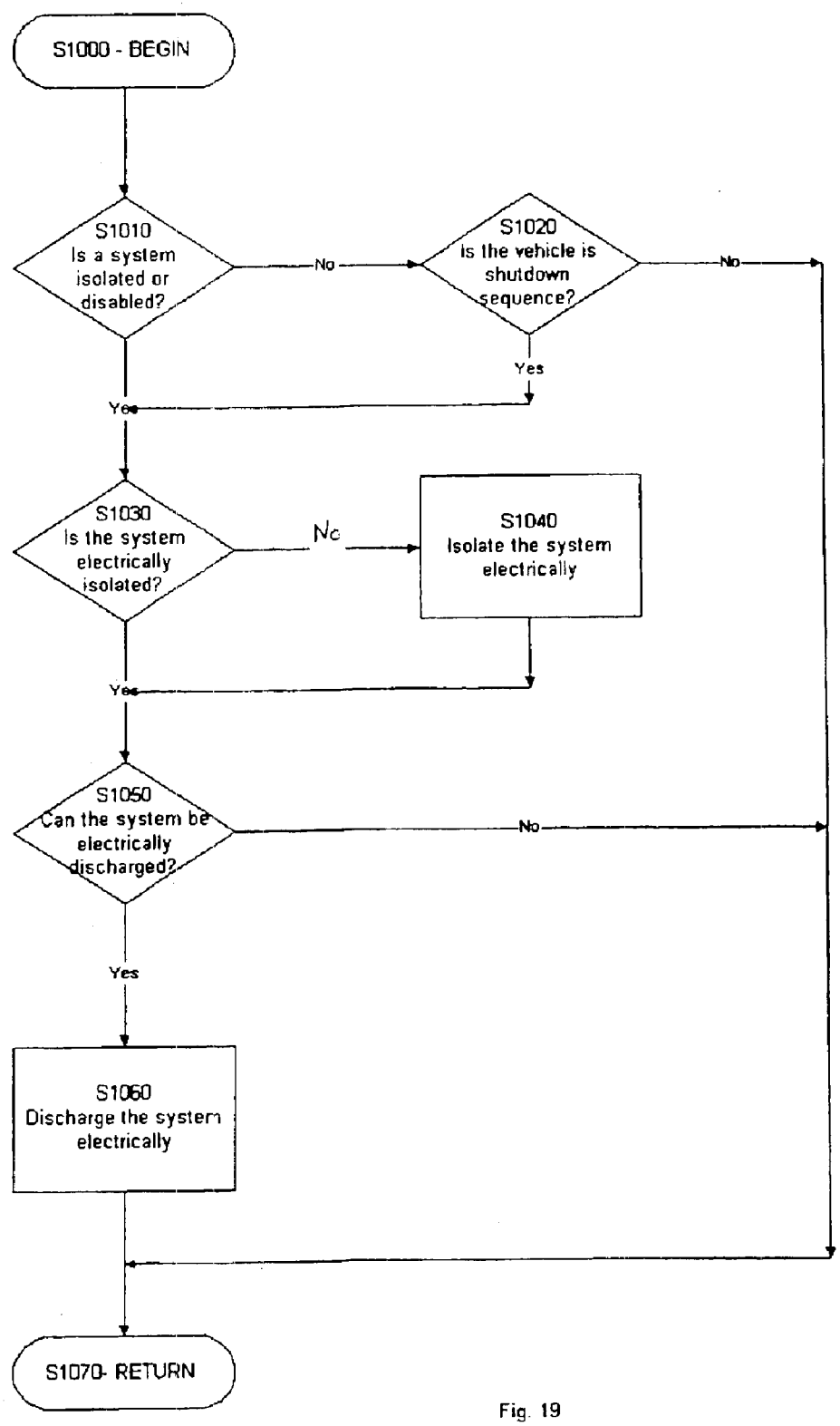

Referring to FIG. 19, a safety state subroutine includes steps S1000–S1070 for placing vehicle systems into a safety state to prevent injury to service personnel who might come into contact with them. In an exemplary embodiment, these systems may include electric traction motors 50 and 60, drive motor controllers 51 and 61, internal combustion engine 300, generator 310, generator controller 320 or battery array 30. It will be appreciated that the safety state subroutine is not limited to this particular implementation but may be extended to other devices or systems installed in a vehicle.

According to an exemplary embodiment of the invention, the control begins at step S1000, and proceeds to step S1010, where it is determined if a system is isolated or disabled. If the system is isolated or disabled (S1010: Yes) the control proceeds to step S1030. If it is determined that the system is not isolated or disabled, the control proceeds to step S1020, where it is determined if the vehicle is in a shutdown sequence. If the vehicle is not in a shutdown sequence (S1020: No), the control proceeds to step S1070, where it returns to the beginning. If it is determined that the vehicle is in a shutdown sequence (S1020: Yes), the control proceeds to step S1030.

Once at step S1030, the control determines if the system is electrically isolated from the other systems of the vehicle. If it is not (S1030: No), the control proceeds to step S1040 and isolates the system. In an exemplary embodiment, this may be done by opening electrical contactors or relays to the main electrical lines and/or electrical control lines. It will be appreciated that the control routine is not limited to this particular implementation, and other methods may be used to isolate a system electrically. If it is determined that the system is electrically isolated (S1030: Yes) or if the system is isolated in step S1040, the control proceeds to step S1050, where it is determined if the system may be electrically discharged. If the system cannot be discharged (S1050: No) the control proceeds to step S1070 where it returns to the beginning. If it is determined that it can be discharged, the control proceeds to step S1060, where the system is discharged. In an exemplary embodiment, relays are used to complete a circuit between the system and an electric resistance, such as a 5 Ohm electrical resistor. This allows residual electrical power to be dissipated at heat to atmosphere. It will be appreciated that the discharge method is not limited to this implementation, and other methods may be used to discharge a system. The control then proceeds to step S1070, where it returns to the beginning.

It will be appreciated by those skilled in the art that the ECU can be implemented using a single special purpose integrated circuit (e.g., ASIC) having a main or central processor section for overall, system-level control, and separate sections dedicated to performing various different specific computations, functions and other processes under control of the PLC. The ECU also can be a plurality of separate dedicated or programmable integrated or other electronic circuits or devices (e.g., hardwired electronic or logic circuits such as discrete element circuits, or programmable logic devices such as PLDs, PLAs, PALs, DSPs or the like). The ECU can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 8–12 and described herein can be used as the ECU. A distributed processing architecture can be used for maximum data/signal processing capability and speed.

While the invention has been described with reference to various exemplary embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A method for adaptively controlling a hybrid electric vehicle including an energy generation system, an energy storage system receiving electric current at least from the generation system, and at least one electric drive motor receiving current from the energy storage system, comprising:

monitoring the status of various vehicle systems;

determining if each system status is within a safe operating range predetermined for that system;

determining an appropriate action necessary to return each non-safe operating system to a safe operating range or to protect each non-safe operating system or vehicle from further damage if each non-safe operating system cannot be returned to a safe operating range;

generating command signals to each non-safe operating system or to other systems to return each non-safe operating system to a safe operating range;

determining if all systems have returned to a safe operating range;

generating command signals to each remaining non-safe operating system or to other systems to isolate and disable each non-safe operating system that has not returned to a safe operating range.

2. The method of claim 1, wherein when a first vehicle system is determined to not be within a safe operating range predetermined for that system, the method further comprises:

determining other vehicle systems that interact with the function of the first vehicle system that is not within a safe operating range; and generating signals to said other vehicle systems to modify or eliminate their interaction with the first vehicle system that is not within a safe operating range.

3. The method of claim 2, wherein when a first vehicle system is determined to not be within a safe operating range predetermined for that system, the method further comprises:

determining other vehicle systems that can provide all or part of the function of the first vehicle system that is not within a safe operating range; and generating signals to the determined other vehicle systems to replace or supplement the function of the first vehicle system that is not within a safe operating range.

4. The method of claim 1, wherein when a first vehicle system is determined to be isolated or disabled, the method further comprises:

determining other vehicle systems that interact with the function of the first vehicle system that is isolated or disabled; and generating signals to said other vehicle systems to modify or eliminate interaction with the first vehicle system that is isolated or disabled.

5. The method of claim 4, wherein when the first vehicle system is determined to be isolated or disabled, the method further comprises:

determining other vehicle systems that can provide all or part of the function of the first vehicle system that is isolated or disabled; and generating signals to the determined other vehicle systems to replace or supplement the function of the first vehicle system that is isolated or disabled.

6. The method of claim 1, wherein the vehicle includes two electric motors and the method further comprises:

determining if one of the two electric motors is initially operating nominally;

resetting a drive warning and faults, if the one electric motor is not initially operating nominally;

determining if the one electric motor is operating nominally after resetting the drive warning and faults; and at least one of shutting down the one electric motor and shifting torque to the other electric motor, if the one electric motor is not operating nominally after resetting the drive warning and faults.

7. The method of claim 6, further comprising:

determining if the other electric motor is operating nominally, if the one electric motor is at least one of initially operating nominally and operating nominally after resetting the drive warning and faults;

increasing torque and velocity upper control limits of the one electric motor, if the other electric motor is not operating nominally; and shifting torque to the one electric motor, if the other electric motor is not operating nominally.

8. The method of claim 6, wherein the one electric motor is operating nominally if a voltage and temperature of the one electric motor are within predetermined parameters.

9. The method of claim 1, wherein a system or component of a system carrying a significant electric charge has been disconnected or isolated and the method further comprises:

discharging the significant electrical charge in the system or component to a ground state automatically to prevent injury of service personnel.

10. A hybrid electric vehicle, including an energy generation system, an energy storage system receiving electric current at least from the generation system, and at least one electric drive motor receiving current from the energy storage system, and a controller that:

monitors the status of various vehicle systems;

determines if the status of each vehicle system is within a safe operating range predetermined for that system;

determines an appropriate action necessary to return each non-safe operating system to a safe operating range or to protect the non-safe operating system or vehicle from further damage;

generates command signals to the non-safe operating system or to other systems to return the non-safe operating system to a safe operating range;

determines if the non-safe operating system has returned to a safe operating range; and generates command signals to the non-safe operating system or to other systems to isolate and disable each non-safe operating system that has not returned to a safe operating range.

11. The hybrid electric vehicle of claim 10, wherein when the controller determines that a first vehicle system is not within a safe operating range, the controller:

determines other vehicle systems that interact with the function of the first vehicle system that is not within a safe operating range; and generates signals to other vehicle systems to modify or eliminate interaction with the first vehicle system that is not within a safe operating range.

12. The hybrid electric vehicle of claim 11, wherein when the controller determines that the first vehicle system is not within a safe operating range predetermined for that system, the controller further:

determines other vehicle systems that can provide all or part of the function of the first vehicle system that is not within a safe operating range;

generates signals to the determined other vehicle systems to replace or supplement the function of the first vehicle system that is not within a safe operating range.

13. The hybrid electric vehicle of claim 10, wherein when the controller determines that a first vehicle system is isolated or disabled, the controller further:

determines other vehicle systems that interact with the function of the first vehicle system that is isolated or disabled; and generates signals to other vehicle systems to modify or eliminate interaction with the first vehicle system that is isolated or disabled.

14. The hybrid electric vehicle of claim 13, wherein when the controller determines that the first vehicle system is isolated or disabled, the controller further:

determines other vehicle systems that can provide all or part of the function of the first vehicle system that is isolated or disabled; and generates signals to the determined other vehicle systems to replace or supplement the function of the first vehicle system that is isolated or disabled.

15. The hybrid electric vehicle of claim 10, further comprising two electric motors, wherein the controller:

determines if one of the two electric motors is initially operating nominally;

resets a drive warning and faults, if the one electric motor is not initially operating nominally;

determines if the one electric motor is operating nominally after resetting the drive warning and faults; and at least one of shuts down the one electric motor and shifts torque to the other electric motor, if the one electric motor is not operating nominally after resetting the drive warning and faults.

16. The hybrid electric vehicle of claim 15, wherein the controller:

determines if the other electric motor is operating nominally, if the one electric motor is at least one of initially operating nominally and operating nominally after resetting the drive warning and faults;

increases torque and velocity upper control limits of the one electric motor, if the other electric motor is not operating nominally; and shifts torque to the one electric motor, if the other electric motor is not operating nominally.

17. The hybrid electric vehicle of claim 15, wherein the one electric motor is operating nominally if a voltage and temperature of the one electric motor are within predetermined parameters.

18. The hybrid electric vehicle of claim 10, wherein when a system or component carrying a significant electric charge has been disconnected or isolated, the controller further:

discharges the electrical charge in the system or component to a ground state automatically to prevent injury of service personnel.

* * * * *